US009293913B2

(12) United States Patent
Umeda et al.

(10) Patent No.: US 9,293,913 B2
(45) Date of Patent: Mar. 22, 2016

(54) ESD PROTECTION COMPONENT AND METHOD FOR MANUFACTURING ESD PROTECTION COMPONENT

(71) Applicant: TDK CORPORATION, Tokyo (JP)

(72) Inventors: Hidenobu Umeda, Tokyo (JP); Yuma Ishikawa, Tokyo (JP); Makoto Yoshino, Tokyo (JP); Keigo Higashida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 98 days.

(21) Appl. No.: 14/339,979

(22) Filed: Jul. 24, 2014

(65) Prior Publication Data

US 2015/0036248 A1 Feb. 5, 2015

(30) Foreign Application Priority Data

Aug. 1, 2013 (JP) .................................. 2013-160186
Aug. 1, 2013 (JP) .................................. 2013-160187
Aug. 9, 2013 (JP) .................................. 2013-166225

(51) Int. Cl.
*H02H 9/00* (2006.01)
*H02H 9/04* (2006.01)
*H01G 4/38* (2006.01)
*H01G 4/40* (2006.01)
*H01C 13/02* (2006.01)

(52) U.S. Cl.
CPC ............... *H02H 9/044* (2013.01); *H01C 13/02* (2013.01); *H01G 4/38* (2013.01); *H01G 4/40* (2013.01)

(58) Field of Classification Search
CPC ..................................................... H02H 9/044

USPC ..................................................... 361/112, 56
See application file for complete search history.

(56) References Cited

U.S. PATENT DOCUMENTS

| 8,320,093 | B2 * | 11/2012 | Asakawa | H03H 7/0107 |
| | | | | 361/118 |
| 8,493,704 | B2 * | 7/2013 | Park | H01F 17/0033 |
| | | | | 361/111 |
| 8,724,284 | B2 | 5/2014 | Umeda et al. | |
| 8,981,889 | B2 * | 3/2015 | Yoo | H01F 27/40 |
| | | | | 336/105 |
| 2014/0204499 | A1 | 7/2014 | Umeda et al. | |

FOREIGN PATENT DOCUMENTS

| JP | A-2003-123936 | 4/2003 |
| JP | A-2011-243896 | 12/2011 |
| KR | 20120132365 A | 12/2012 |

* cited by examiner

*Primary Examiner* — Stephen W Jackson
(74) *Attorney, Agent, or Firm* — Oliff PLC

(57) ABSTRACT

An ESD suppressor is configured including first and second discharge electrodes arranged as separated from each other, and a discharge inducing portion kept in contact with the first and second discharge electrodes so as to connect mutually opposed portions of the first and second discharge electrodes to each other. The discharge inducing portion contains metal particles. The first and second discharge electrodes are located on the coil side with respect to the discharge inducing portion when viewed in a stack direction of a plurality of insulator layers. An element body has a cavity portion located so as to cover the whole of the discharge inducing portion when viewed in the stack direction from the coil side. The cavity portion is in contact with the mutually opposed portions of the first and second discharge electrodes and with the discharge inducing portion.

9 Claims, 18 Drawing Sheets

*Fig.17*
(a)
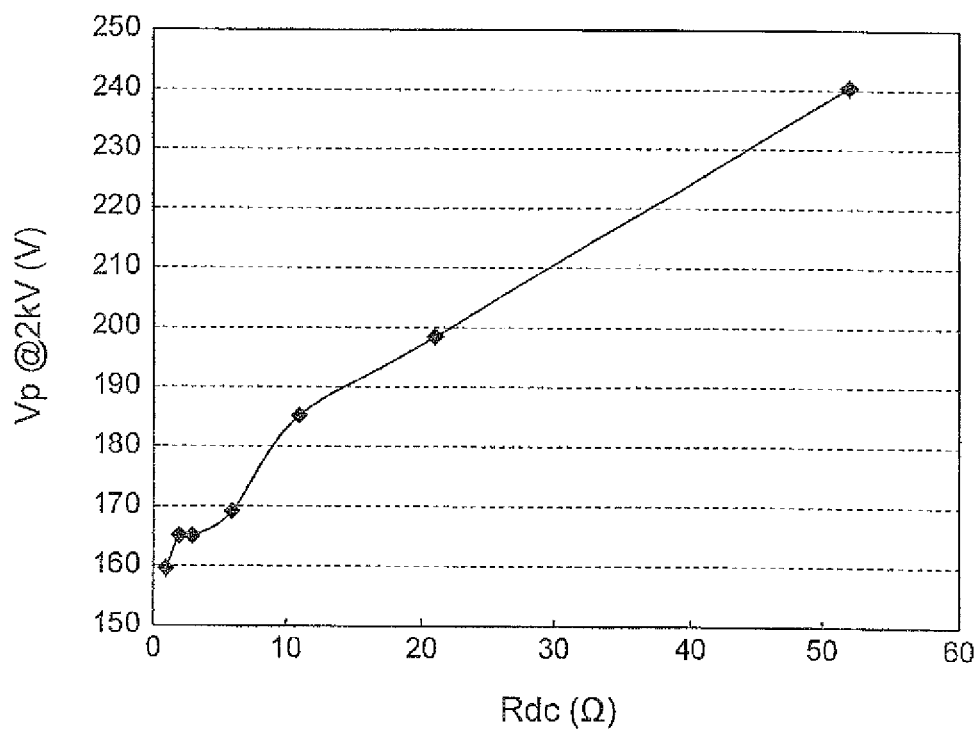
(b)
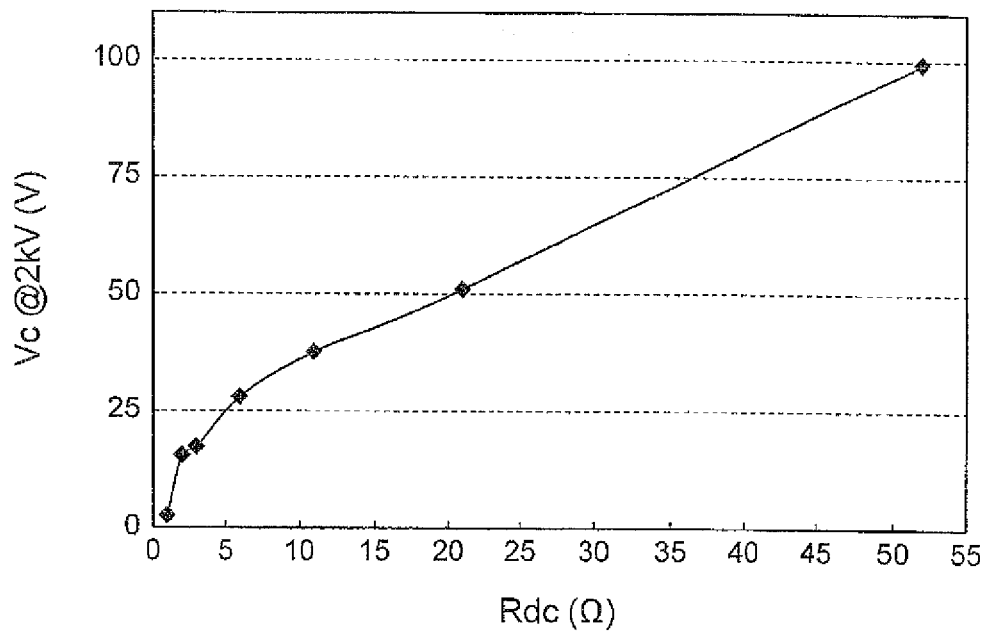

Fig.18
(a)
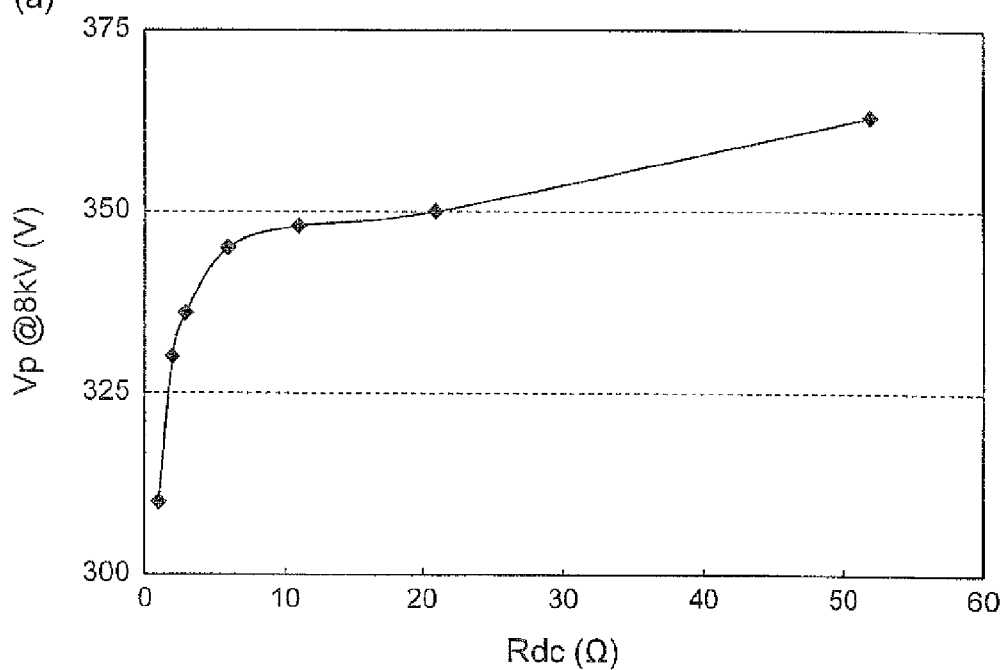
(b)
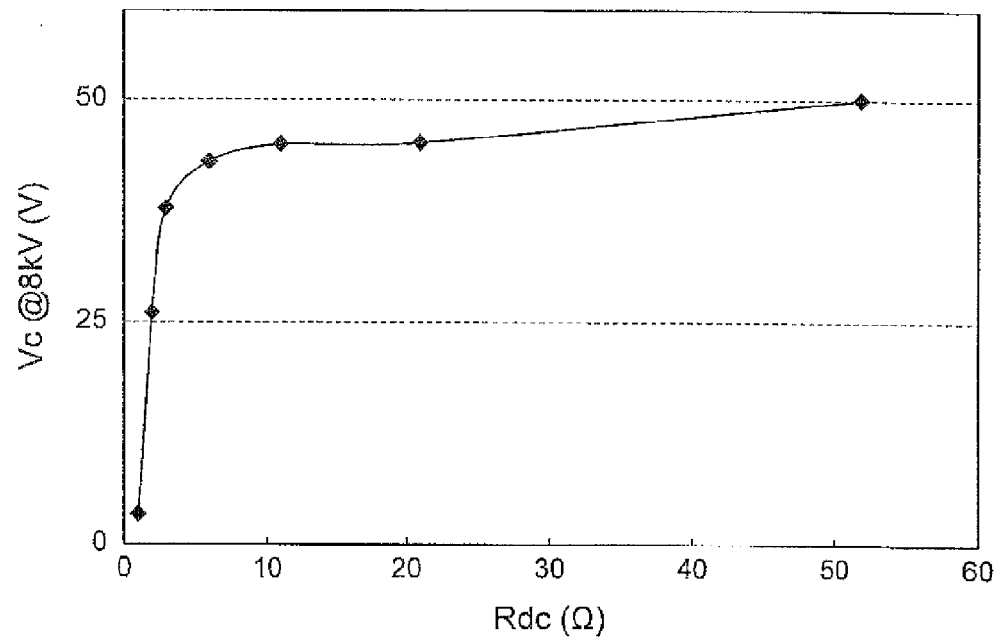

ESD PROTECTION COMPONENT AND METHOD FOR MANUFACTURING ESD PROTECTION COMPONENT

BACKGROUND OF THE INVENTION

1. Field of the Invention

The present invention relates to an ESD (electrostatic discharge) protection component and a method for manufacturing the EST protection component.

2. Related Background Art

There is a known ESD protection component provided with an element body in which a plurality of insulator layers are stacked, a coil constructed by connecting a plurality of internal conductors to each other and arranged in the element body, and an ESD suppressor arranged in the element body and configured including first and second discharge electrodes arranged as separated from each other (e.g., cf. Japanese Patent Application Laid-Open Publication No. 2003-123936 (which will be referred to hereinafter as Patent Literature 1)). There is another known ESD protection component provided with an ESD suppressor configured including first and second discharge electrodes arranged as separated from each other, and a discharge inducing portion kept in contact with the first and second discharge electrodes so as to connect mutually opposed portions of the first and second discharge electrodes to each other and containing metal particles, in which a cavity portion is arranged so as to be in contact with the foregoing mutually opposed portions of the first and second discharge electrodes and with the discharge inducing portion (e.g., cf. Japanese Patent Application Laid-Open Publication No. 2011-243896 (which will be referred to hereinafter as Patent Literature 2)).

SUMMARY OF THE INVENTION

Since the first and second discharge electrodes are arranged as separated from each other in the ESD suppressor (ESD protection component), electric discharge occurs in the separate region with application of a voltage not less than a predetermined value between the electrodes. The discharge inducing portion has a function to facilitate occurrence of the electric discharge in the separate region between the first and second discharge electrodes. The ESD suppressor has the capability of absorbing ESD (electrostatic discharge).

In the ESD protection component described in Patent Literature 2, the ESD suppressor has the discharge inducing portion and the cavity portion is arranged so as to be in contact with the discharge inducing portion. For this reason, the electric discharge suitably occurs between the first and second discharge electrodes (or between the mutually opposed portions thereof), whereby the desired ESD absorption capability can be readily ensured. It is also conceivable to introduce the discharge inducing portion and the cavity portion, for readily ensuring the desired ESD absorption capability, to the ESD protection component as described in Patent Literature 1, which has the configuration wherein the coil and the ESD suppressor are arranged in the element body.

However, if the discharge inducing portion and the cavity portion were introduced to the ESD protection component having the configuration wherein the coil and the ESD suppressor are arranged in the element body, the problem as described below could arise. When the coil composed of the internal conductors and the ESD suppressor configured including the discharge inducing portion are arranged in the element body, it is necessary to obtain the element body inside which the internal conductors and the discharge inducing portion are arranged. The element body is usually obtained through a process of carrying out a thermal treatment such as firing. At this time, a material making up the internal conductors can diffuse into the discharge inducing portion.

The diffusion of the material making up the internal conductors into the discharge inducing portion will lead to change in characteristic of the discharge inducing portion. If the material making up the internal conductors, i.e., a conductor material diffuses into the discharge inducing portion, the electric resistance of the discharge inducing portion will decrease and the electric discharge will occur between the first and second discharge electrodes with application of a relatively low voltage. If an amount of the conductor material diffusing into the discharge inducing portion is large, the discharge inducing portion will become substantially a conductor and a short circuit will be made between the first and second discharge electrodes.

In the ESD protection component having the configuration wherein the coil and the ESD suppressor are arranged in the element body, parasitic capacitance occurs between the internal conductors forming the coil and, the first and second discharge electrodes or the discharge inducing portion included in the ESD suppressor. The discharge inducing portion in contact with the first and second discharge electrodes contains the metal particles and thus has high permittivity. For this reason, the parasitic capacitance occurring between the coil and the ESD suppressor is relatively large. The parasitic capacitance can be one of factors to cause, for example, degradation of noise characteristic or degradation of characteristic of transmission signal.

The first aspect of the present invention has an object to provide an ESD protection component in which the change in characteristic of the discharge inducing portion is suppressed and which can reduce the parasitic capacitance occurring between the coil and the ESD suppressor.

In the ESD protection component described in Patent Literature 1, the first and second electrodes are arranged as separated from each other. For this reason, when the voltage not less than the predetermined value is applied between a first external electrode and a second external electrode, the electric discharge occurs between the first discharge electrode and the second discharge electrode to absorb ESD. For the ESD suppressor, in order to determine whether a characteristic (e.g., an electric characteristic such as capacitance or insulation resistance) satisfies a desired value, it is necessary to measure the characteristic.

However, in the case of the ESD protection component described in Patent Literature 1, it is possible to measure a characteristic of the coil (e.g., an electric characteristic such as DC resistance or inductance) but the ESD protection component has a problem that it is difficult to measure the characteristic of the ESD suppressor. In the ESD protection component described in Patent Literature 1, the ESD suppressor and the coil are connected in parallel between the first external electrode and the second external electrode; that is, the first external electrode and the second external electrode are made conductive through the coil (the plurality of internal conductors). For this reason, it is possible to measure the characteristic of the coil but it is difficult to measure the characteristic of the ESD suppressor.

The second aspect of the present invention has an object to provide an ESD protection component allowing the measurement of each of the characteristics of the coil and the ESD suppressor and a method for manufacturing the ESD protection component.

The ESD protection components are expected to improve the ESD absorption capability.

The third aspect of the present invention has an object to provide an ESD protection component allowing improvement in the ESD absorption capability.

The first aspect of the present invention is an ESD protection component comprising: an element body in which a plurality of insulator layers are stacked; a coil constructed by connecting a plurality of internal conductors to each other, and arranged in the element body; and an ESD suppressor arranged in the element body so as to be located alongside of the coil in a stack direction of the plurality of insulator layers; the ESD suppressor comprising first and second discharge electrodes arranged as separated from each other, and a discharge inducing portion kept in contact with the first and second discharge electrodes so as to connect mutually opposed portions of the first and second discharge electrodes to each other, and containing metal particles; the first and second discharge electrodes being located on the coil side with respect to the discharge inducing portion, when viewed in the stack direction; the element body having a cavity portion located so as to cover the whole of the discharge inducing portion when viewed in the stack direction from the coil side; and the cavity portion being in contact with the mutually opposed portions of the first and second discharge electrodes and with the discharge inducing portion.

In the present aspect, since the cavity portion is in contact with the mutually opposed portions of the first and second discharge electrodes and with the discharge inducing portion, the electric discharge suitably occurs between the mutually opposed portions of the first and second discharge electrodes. This can readily ensure the desired ESD absorption capability.

The cavity portion is located so as to cover the whole of the discharge inducing portion when viewed in the stack direction from the coil side. Namely, the cavity portion is located between the coil (internal conductors) and the discharge inducing portion. The cavity portion is usually formed as a result of vanishment of a material such as resin in the process of carrying out the thermal treatment for obtaining the element body. A temperature at which the material for formation of the cavity portion vanishes is lower than a melting point of the material making up the internal conductors. Therefor; the cavity portion has been formed before arrival at a state in which the material making up the internal conductors can diffuse. Even in the state in which the material making up the internal conductors can diffuse, the cavity portion prevents the material making up the internal conductors from diffusing to the discharge inducing portion, because the cavity portion is located between the coil (internal conductors) and the discharge inducing portion. As a result, the change in characteristic of the discharge inducing portion is suppressed.

The cavity portion with the permittivity lower than that of the discharge inducing portion is located between the coil (internal conductors) and the discharge inducing portion. For this reason, even in the state in which the discharge inducing portion has the high permittivity because of inclusion of the metal particles, the cavity portion reduces the parasitic capacitance occurring due to the permittivity of the discharge inducing portion. As a result, the parasitic capacitance occurring between the coil and the ESD suppressor can be reduced.

The melting point of the material making up the internal conductors may be lower than a melting point of a material making up the metal particles. When the melting point of the material making up the internal conductors is lower than that of the material making up the metal particles, the material making up the internal conductors is likely to diffuse. However, since the cavity portion is located so as to cover the whole of the discharge inducing portion when viewed in the stack direction from the coil side, the material making up the internal conductors can be surely prevented from diffusing to the discharge inducing portion, even in the state in which the material making up the internal conductors is relatively likely to diffuse.

The first discharge electrode may have a first side portion extending in one direction perpendicular to the stack direction, the second discharge electrode may have a second side portion extending in the one direction, and the first and second discharge electrodes may be arranged as separated from each other so that the first side portion and the second side portion are opposed to each other. In this case, the first side portion opposed to the second side portion serves as a dischargeable region in the first discharge electrode and the second side portion opposed to the first side portion serves as a dischargeable region in the second discharge electrode. The dischargeable regions can be set longer in the configuration in which the first and second discharge electrodes are arranged so that the first and second side portions are opposed to each other than in a configuration in which the first and second discharge electrodes are arranged so that end portions of the first and second discharge electrodes are opposed to each other. The longer the dischargeable regions, the more the durability as the ESD protection component improves.

The second aspect of the present invention is an ESD protection component comprising: an element body inside which an EST) suppressor comprising first and second discharge electrodes arranged as separated from each other, and a coil constructed by connecting a plurality of internal conductors to each other are arranged; a first external electrode connected to the first discharge electrode and arranged on an exterior surface of the element body; a second external electrode connected to the second discharge electrode and arranged on the exterior surface; a third external electrode connected to one end of the coil and arranged on the exterior surface; and a fourth external electrode connected to the other end of the coil and arranged on the exterior surface.

The element body may have a pair of end surfaces opposed to each other, and four side surfaces adjacent to the pair of end surfaces, as the exterior surface, one side surface out of the four side surfaces may be defined as a mounting surface, the first and second external electrodes may be arranged on the one side surface side, the third external electrode may be arranged on one end surface side, and the fourth external electrode may be arranged on the other end surface side.

Another mode of the second aspect of the present invention is a method for manufacturing an ESD protection component, the method comprising: a step of obtaining a structure comprising an element body inside which an ESD suppressor comprising first and second discharge electrodes arranged as separated from each other and a coil constructed by connecting a plurality of internal conductors to each other are arranged, a first external electrode connected to the first discharge electrode and arranged on an exterior surface of the element body, and a second external electrode connected to the second discharge electrode and arranged on the exterior surface of the element body; a step of bringing probes into contact with the first and second external electrodes and measuring a characteristic of the ESD suppressor, after the structure is obtained; a step of forming a third external electrode connected to the first external electrode and to one end of the coil and a fourth external electrode connected to the second external electrode and to the other end of the coil, on the exterior surface, after the characteristic of the ESD suppressor is measured; and a step of bringing probes into contact with the third and fourth external electrodes and measuring a characteristic of the coil, after the third and fourth external electrodes are formed.

In the present aspect, after obtaining the structure comprising the element body inside which the ESD suppressor and the coil are arranged, and the first and second external electrodes arranged on the exterior surface of the element body, the probes are brought into contact with the first and second external electrodes, whereby the characteristic of the ESD suppressor is measured. Before the formation of the third and fourth external electrodes, the first external electrode is not connected to the one end of the coil and the second external electrode is not connected to the other end of the coil. Therefore, before the formation of the third and fourth external electrodes, the ESD suppressor and the coil are not connected in parallel and thus the characteristic of the ESD suppressor can be measured.

The characteristic of the coil is measured while the probes are brought into contact with the third and fourth external electrodes, after the formation of the third and fourth external electrodes. After the formation of the third and fourth external electrodes, the ESD suppressor and the coil are connected in parallel. However, since the first discharge electrode and the second discharge electrode are in a mutually isolated state without application of a surge voltage like ESD, the characteristic of the coil can be measured.

Incidentally, the Inventors conducted elaborate research on the ESD protection components capable of achieving improvement in ESD absorption capability and discovered the new fact as described below.

The value of DC resistance of the coil connected in parallel to the ESD suppressor configured including the first discharge electrode and the second discharge electrode affects the ESD absorption capability. Specifically, as the value of DC resistance of the coil increases, an effect of suppressing the peak voltage becomes lower, resulting in degradation of the peak voltage. Furthermore, when the value of DC resistance of the coil exceeds 21Ω, this degradation of the peak voltage is accelerated. Namely, it was found that the tendency of change of the ESD absorption capability against the value of DC resistance of the coil switched at a certain variation point.

As a consequence of this, the Inventors came to have not only such a finding that the ESD absorption capability could be improved more with decreasing value of DC resistance of the coil, but also such a finding that the ESD absorption capability could be effectively improved by division at the certain variation point of not more than 21Ω.

In light of the above research result, the third aspect of the present invention is an ESD protection component comprising: an element body in which a plurality of insulator layers are stacked; a first discharge electrode and a second discharge electrode arranged as separated from each other inside the element body; a coil arranged inside the element body; a first external electrode and a second external electrode arranged on an exterior surface of the element body; the first discharge electrode being connected to the first external electrode and the second discharge electrode being connected to the second external electrode; one end of the coil being connected to the first external electrode and the other end of the coil being connected to the second external electrode; and a value of DC resistance of the coil being not more than 21Ω.

In the present aspect, the coil is connected in parallel to an ESD suppressor configured including the first discharge electrode and the second discharge electrode and the value of DC resistance of the coil is not more than 21Ω. For this reason, the degradation of the peak voltage can be suppressed and the ESD absorption capability can be improved.

The value of DC resistance of the coil may be not more than 11Ω or may be not more than 2Ω.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 17 is graphs showing relations between values of DC resistance of the coil and values of discharge voltage, with application of charging voltage of 2 kV.

FIG. 18 is graphs showing relations between values of DC resistance of the coil and values of discharge voltage, with application of charging voltage of 8 kV.

DESCRIPTION OF THE PREFERRED EMBODIMENTS

The embodiments of the present invention will be described below in detail with reference to the accompanying drawings. In the description, identical elements or elements with identical functionality will be denoted by the same reference symbols, without redundant description.

First Embodiment

Figure 1:
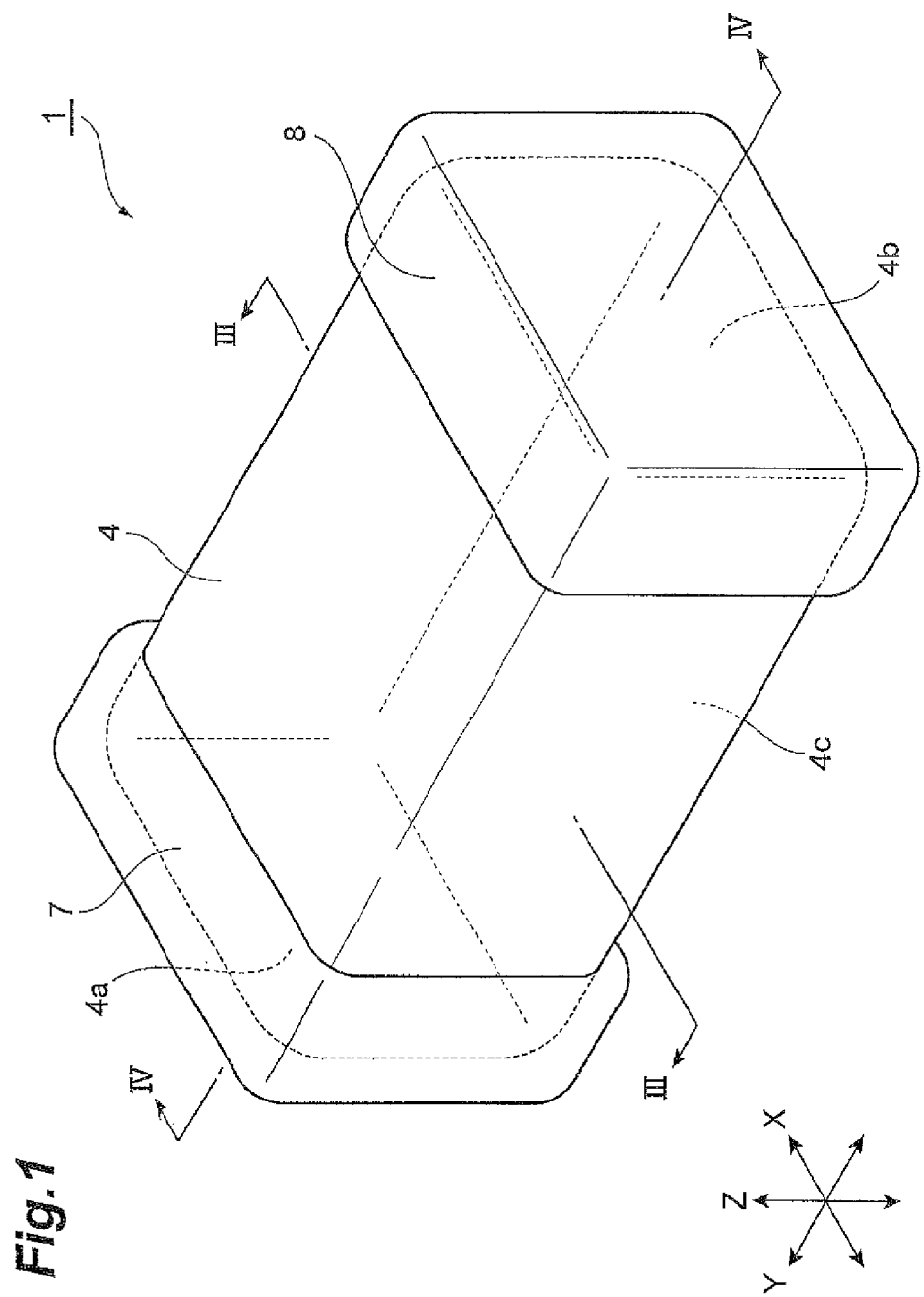
FIG. 1 is a perspective view showing an ESD protection component according to a first embodiment.
Figure 2:
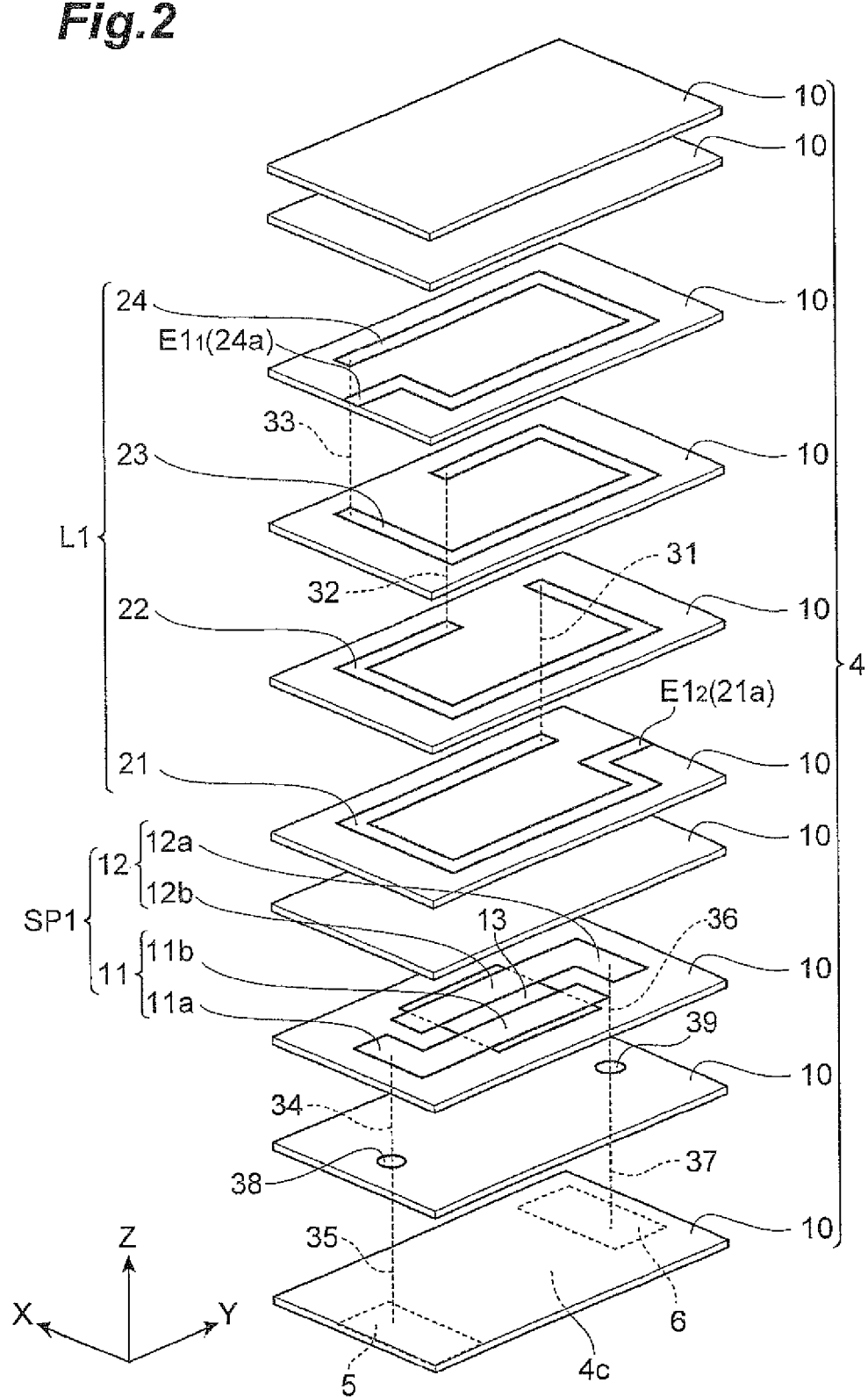
FIG. 2 is an exploded perspective view showing a configuration of an element body.
Figure 3:
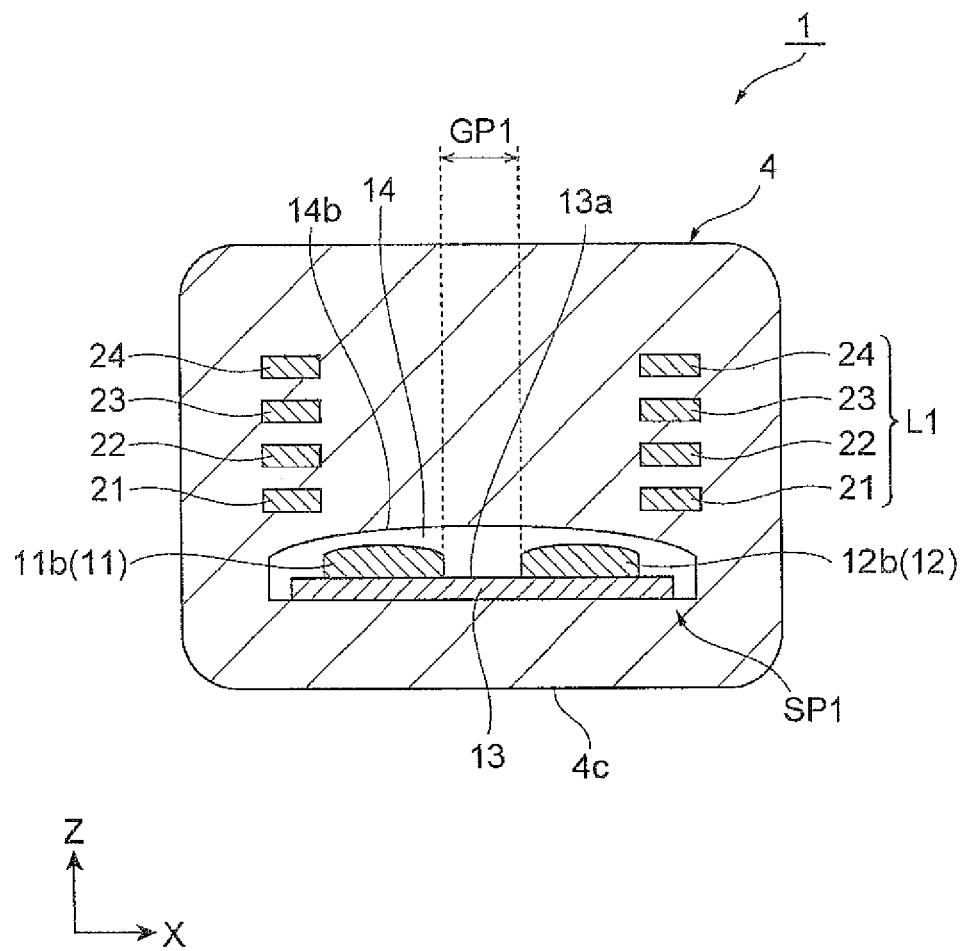
FIG. 3 is a drawing showing a cross-sectional configuration along the line III-III shown in FIG. 1.
Figure 4:
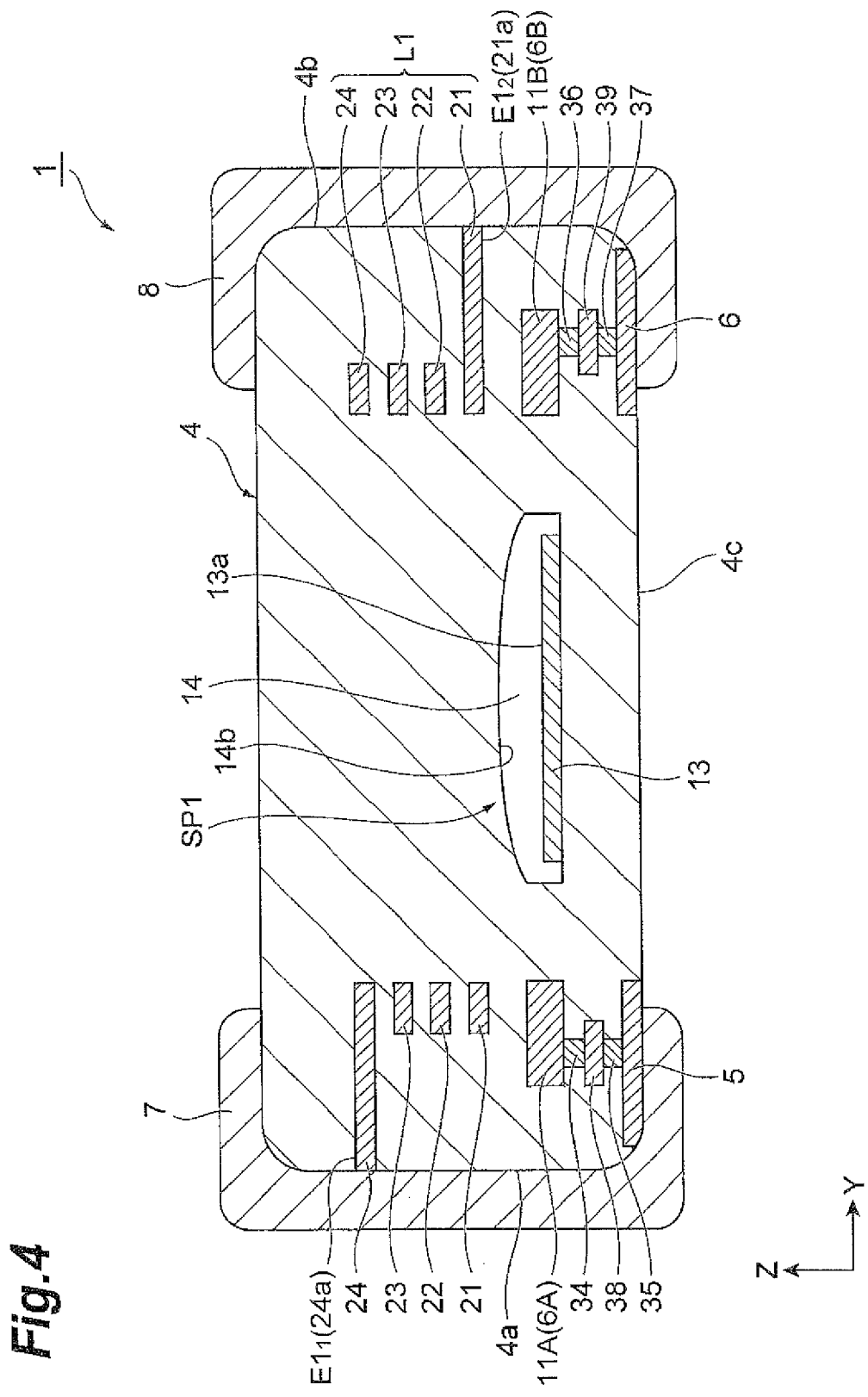
FIG. 4 is a drawing showing a cross-sectional configuration along the line IV-IV shown in FIG. 1.

First, a configuration of an ESD protection component 1 according to the first embodiment will be described with reference to FIGS. 1 to 4. FIG. 1 is a perspective view showing the ESD protection component according to the present embodiment. FIG. 2 is an exploded perspective view showing a configuration of an element body. FIG. 3 is a drawing showing a cross-sectional configuration along the line III-III shown in FIG. 1. FIG. 4 is a drawing showing a cross-sectional configuration along the line IV-IV shown in FIG. 1.

The ESD protection component 1 is an electronic component that is to be mounted on a circuit board of an electronic device to protect the electronic device from ESD. As shown in FIGS. 1 to 4, the ESD protection component 1 is provided with an element body 4 of a nearly rectangular parallelepiped shape, an external electrode 5, an external electrode 6, an external electrode 7, and an external electrode 8 arranged on the exterior surface of the element body 4, a coil L1 arranged inside the element body 4, and an ESD suppressor SP1 arranged inside the element body 4 and having the ESD absorption capability. In the description hereinafter, Z-direction is defined along a direction of height of the element body 4, Y-direction along the longitudinal direction of the element body 4, and X-direction along the transverse direction of the element body 4.

The element body 4 is configured in a configuration wherein a plurality of insulator layers 10 are stacked. Each insulator layer 10 has a nearly rectangular shape. Each insulator layer 10 has an electrical insulation property and is composed of a sintered body of an insulator green sheet. In actual element body 4, the insulator layers 10 are integrated with each other so that no boundary can be visually recognized between them. The element body 4 has, as its exterior surface, a pair of end surfaces 4a, 4b opposed to each other, and four side surfaces adjacent to the end surfaces 4a, 4b. The pair of end surfaces 4a, 4b are opposed to each other in the longitudinal direction of the element body 4. One side surface 4c out of the four side surfaces is defined, for example, as a surface (mounting surface) facing another electronic device not shown (e.g., a circuit board, an electronic component, or the like).

The external electrode 5 and the external electrode 6 are arranged on the side surface 4c of the element body 4. The external electrode 5 is located at an end nearer to the end surface 4a on the side surface 4c. The external electrode 6 is located at an end nearer to the end surface 4b on the side surface 4c. The external electrodes 5 and 6 function as so-called bottom electrodes. The external electrode 7 is arranged on the end surface 4a side of the element body 4. The external electrode 7 is formed so as to cover the entire area of the end surface 4a of the element body 4 and have portions being located on the four side surfaces adjacent to the end surface 4a. The external electrode 8 is arranged on the end surface 4b side of the element body 4. The external electrode 8 is formed so as to cover the entire area of the end surface 4b of the element body 4 and have portions being located on the four side surfaces adjacent to the end surface 4b. The external electrode 5 and the external electrode 7 are connected to each other and the external electrode 6 and the external electrode 8 are connected to each other (cf. FIG. 4).

The coil L1 is constructed by connecting end portions of conductor 21, conductor 22, conductor 23, and conductor 24 being a plurality of internal conductors to each other by respective through-hole conductors 31, 32, and 33. The conductor 21, conductor 22, conductor 23, and conductor 24 are juxtaposed in a stack direction of the insulator layers 10 (which will be referred to hereinafter simply as "stack direction") inside the element body 4. The conductors 21 to 24 are arranged in an order of the conductor 21, conductor 22, conductor 23, and conductor 24 named from the side nearer to the side surface 4c of the element body 4 in the stack direction.

The through-hole conductor 31 is located between the conductor 21 and the conductor 22 and electrically connects the conductor 21 and the conductor 22. The through-hole conductor 32 is located between the conductor 22 and the conductor 23 and electrically connects the conductor 22 and the conductor 23. The through-hole conductor 33 is located between the conductor 23 and the conductor 24 and electrically connects the conductor 23 and the conductor 24. Each of the through-hole conductors 31-33 functions as a part of the coil L1.

An end portion 24a of the conductor 24 is exposed in the end surface 4a of the element body 4 and is connected to the external electrode 7 (cf. FIG. 4). An end portion 21a of the conductor 21 is exposed in the end surface 4b of the element body 4 and connected to the external electrode 8. The end portion 24a of the conductor 24 corresponds to one end $E1_1$ of the coil L1 and the end portion 21a of the conductor 21 corresponds to the other end $E1_1$ of the coil L1. Therefore, the coil L1 is electrically connected to each of the external electrodes 7, 8. The DC resistance of the coil L1 can be measured between the external electrodes 7, 8. In the present embodiment, the value of DC resistance of the coil L1 is set not more than 21Ω.

The ESD suppressor SP1 is located at a position closer to the side surface 4c of the element body 4 in the stack direction than the coil L1 is. The ESD suppressor SP1 is configured including a first discharge electrode 11 and a second discharge electrode 12, and a discharge inducing portion 13. The first discharge electrode 11 and the second discharge electrode 12 are arranged as separated from each other on the same insulator layer 10. The discharge inducing portion 13 connects the first discharge electrode 11 and the second discharge electrode 12.

The first discharge electrode 11 has an end portion 11a and a first side portion 11b extending in the longitudinal direction (the Y-direction in the drawing) of the insulator layer 10. The end portion 11a of the first discharge electrode 11 is connected to a connection conductor 38 by a through-hole conductor 34. The connection conductor 38 is connected to the external electrode 5 by a through-hole conductor 35. By this, the first discharge electrode 11 is electrically connected to the external electrode 5.

The second discharge electrode 12 has an end portion 12a and a second side portion 12b extending in the longitudinal direction of the insulator layer 10. The end portion 12a of the second discharge electrode 12 is connected to a connection conductor 39 by a through-hole conductor 36. The connection conductor 39 is connected to the external electrode 6 by a through-hole conductor 37. By this, the second discharge electrode 12 is electrically connected to the external electrode 6.

As described above, the external electrode 5 and the external electrode 7 are connected and the external electrode 6 and the external electrode 8 are connected. For this reason, the ESD suppressor SP1 is electrically connected through the external electrode 5 to the external electrode 7 and electrically connected through the external electrode 6 to the external electrode 8. Therefore, the ESD suppressor SP1 and the coil L1 are connected in parallel between the external electrode 7 and the external electrode 8.

The first discharge electrode 11 and the second discharge electrode 12 are arranged as separated from each other so that the first side portion 11b extending in one direction perpendicular to the stack direction is opposed to the second side portion 12b extending in the one direction. Namely, the first discharge electrode 11 and the second discharge electrode 12 are arranged so as to be adjacent in a direction (the X-direction in the drawing) perpendicular to the longitudinal direction (the Y-direction in the drawing) of the insulator layer 10, and are opposed as separated from each other. By this, a gap portion GP1 (cf. FIG. 3) is formed between the first side portion 11b and the second side portion 12b. When a voltage not less than a predetermined value is applied between the external electrode 7 and the external electrode 8, electric discharge occurs in the gap portion GP1 between the first discharge electrode 11 and the second discharge electrode 12.

The discharge inducing portion 13 is located between the first and second discharge electrodes 11, 12 and the external electrodes 5, 6 in the stack direction. The discharge inducing portion 13 is in contact with the first discharge electrode 11 and the second discharge electrode 12 so as to connect the first side portion 11b and the second side portion 12b. Namely, the discharge inducing portion 13 is formed so as to connect mutually opposed portions of the first and second discharge electrodes 11, 12 to each other. The discharge inducing portion 13 has a function to facilitate occurrence of the electric discharge between the first discharge electrode 11 and the second discharge electrode 12.

The element body 4 has a cavity portion 14 (cf. FIGS. 3 and 4). The cavity portion 14 is located between the discharge inducing portion 13 and the coil L1. Surfaces defining the cavity portion 14 include a surface 13a where the first and second discharge electrodes 11, 12 are arranged, in the discharge inducing portion 13, and a surface 14b opposed to the surface 13a. The surface 13a is also the surface opposed to the coil L1 in the discharge inducing portion 13. The surface 14b is located between the surface 13a and the coil L1 in the stack direction. On the surface 13a, the first and second discharge electrodes 11, 12 are formed so that the first and second side portions 11b, 12b being the mutually opposed portions thereof are placed thereon.

The surface 14b opposed to the surface 13a is formed so as to be larger than the surface 13a and, when viewed from the stack direction, the surface 14b is formed so as to cover the whole of the surface 13a. Namely, the cavity portion 14 is located so as to cover the whole of the discharge inducing portion 13 when viewed in the stack direction from the coil L1 side. Since the surfaces defining the cavity portion 14 include the surface 13a of the discharge inducing portion 13, the cavity portion 14 is in contact with the first and second side portions 11b and 12b located on the surface 13a, and with the discharge inducing portion 13. The cavity portion 14 has a function to absorb thermal expansion of the first discharge electrode 11, the second discharge electrode 12, the insulator layers 10, and the discharge inducing portion 13 during the electric discharge.

Next, materials of the respective constituent elements will be described in detail.

Each of the external electrodes 5-8, the first discharge electrode 11, and the second discharge electrode 12 is comprised of a conductor material containing Ag, Pd, Au, Pt, Cu, Ni, Al, Mo, or W. The external electrodes 5-8 may be made of an alloy (e.g., an Ag/Pd alloy, Ag/Cu alloy, Ag/Au alloy, or Ag/Pt alloy).

The insulator layers 10 are comprised of a single material selected from $Fe_2O_3$, NiO, CuO, ZnO, MgO, $SiO_2$, $TiO_2$, $Mn_2O_3$, SrO, CaO, BaO, $SnO_2$, $K_2O$, $Al_2O_3$, $ZrO_2$, $B_2O_3$, and so on. The insulator layers 10 may be comprised of a ceramic material in which two or more types of materials among the foregoing materials are mixed. The insulator layers 10 may contain glass. The insulator layers 10 preferably contain copper oxide (CuO or $Cu_2O$) for enabling low-temperature sintering.

Each of the conductors 21-24, each of the through-hole conductors 31-37, and each of the connection conductors 38, 39 contain a conductor material, for example, such as Ag or Pd. Each of the conductors 21-24, the through-hole conductors 31-37, and the connection conductors 38, 39 is constructed as a sintered body of an electroconductive paste containing the foregoing conductor material.

The discharge inducing portion 13 is comprised of a single material selected from $Fe_2O_3$, NiO, CuO, ZnO, MgO, $SiO_2$, $TiO_2$, $Mn_2O_3$, SrO, CaO, BaO, $SnO_2$, $K_2O$, $Al_2O_3$, $ZrO_2$, $B_2O_3$, and so on. The discharge inducing portion 13 may be made containing a material in which two or more types of materials among the foregoing materials are mixed. The discharge inducing portion 13 contains metal particles of Ag, Pd, Au, Pt, an Ag/Pt alloy, Ag/Cu alloy, Ag/Au alloy, or Ag/Pt alloy, or the like. The discharge inducing portion 13 may contain semiconductor particles of $RuO_2$ or the like. The discharge inducing portion 13 may contain glass or tin oxide (SnO or $SnO_2$). The melting point of the metal material contained in the form of metal particles in the discharge inducing portion 13 is higher than that of the conductor material contained in each of the conductors 21-24 forming the coil L1.

Figure 5:
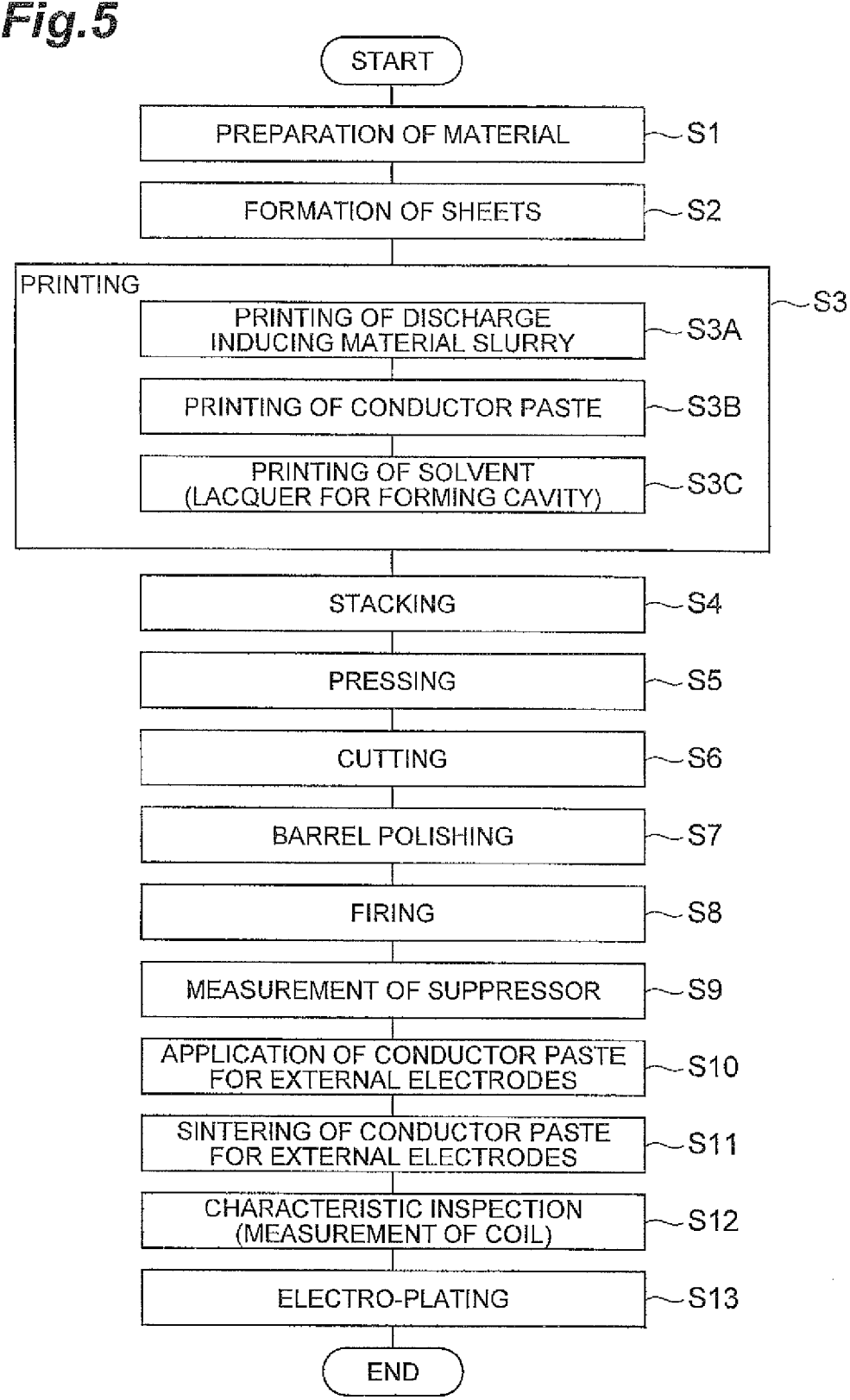
FIG. 5 is a flowchart showing a method for manufacturing the ESD protection component according to the first embodiment.

Next, a method for manufacturing the ESD protection component 1 in the present embodiment will be described with reference to FIG. 5. FIG. 5 is a flowchart showing the method for manufacturing the ESD protection component according to the present embodiment.

First, a slurry of the material making up the insulator layers 10 is prepared (S1) and green sheets for the insulator layers 10 are formed using the slurry (S2). Specifically, the slurry for the insulator layers 10 is prepared by mixing a predetermined amount of dielectric powder containing copper oxide (CuO) with an organic vehicle containing an organic solvent and an organic binder. The dielectric powder to be used herein can be a dielectric material containing an oxide of Mg, Cu, Zn, Si, or Sr (or may be one of other dielectric materials) as major component. Thereafter, the slurry is applied onto PET film by the doctor blade method to form green sheets in the thickness of about 20 µm. Through holes are formed by laser processing, at positions where the respective through-hole conductors 31-37 are to be formed in each of the insulator layers 10.

After the formation of the green sheets for the insulator layers 10, a discharge inducing material slurry, a conductor paste, and a solvent (lacquer for forming cavity) are printed at respective predetermined positions on the green sheets (S3). The printing of the discharge inducing material slurry is carried out by preparing the discharge inducing material slurry for formation of the discharge inducing portion 13 after fired and applying the slurry onto the sheets for the insulator layers 10 (S3A). Specifically, powders of tin oxide, an insulator, and a conductor weighed to respective predetermined amounts are mixed with an organic vehicle containing an organic solvent and an organic binder, to prepare the discharge inducing material slurry. For example, industrial $SnO_2$ can be used as tin oxide and a dielectric powder as the insulator. The dielectric powder to be used herein can be a dielectric material containing an oxide of Mg, Cu, Zn, Si, or Sr (or may be one of other dielectric materials) as major component. The conductor powder to be used herein can be an Ag/Pd alloy powder (or may be Ag, Pd, Au, Pt, or a mixture of two or more of those, or a compound of one or more of those). The powders are mixed well so as to achieve a state in which particles of tin oxide and metal particles of the Ag/Pd alloy are intermingled. The discharge inducing material slurry becomes the discharge inducing portion 13 through below-described firing.

The printing of the conductor paste is carried out by applying the conductor paste for formation of conductor patterns onto the green sheets for the insulator layers 10 by screen printing or the like (S3B). The conductor patterns become the conductors 21-24, the first and second discharge electrodes 11, 12, the connection conductors 38, 39, and the external electrodes 5, 6 through the below-described firing. Each conductor pattern is formed by drying the screen-printed conductor paste. The through holes are filled with the conductor paste during the formation of the conductor patterns. The conductor paste filling the through holes becomes each of the through-hole conductors 31-37 through the below-described firing.

The printing of the lacquer for forming cavity is carried out by applying the lacquer for forming cavity onto the green sheets for the insulator layers 10 so as to cover the discharge inducing material slurry previously printed and the conductor paste for formation of the first and second side portions 11*b*, 12*b* of the first and second discharge electrodes 11, 12 also previously printed (S3C). The lacquer for forming cavity is paint for formation of the cavity portion 14 and contains resin. A temperature at which the lacquer for forming cavity vanishes is lower than the melting point of the material making up the internal conductors 21-24.

The green sheets for the insulator layers 10 with the discharge inducing material slurry, the conductor paste, and the lacquer for forming cavity printed thereon are stacked in order (S4) and pressed (S5), to obtain a multilayer body of the green sheets. Thereafter, the multilayer body is cut in the size of each individual ESD protection component (S6) to obtain a plurality of green chips. The stacking order of the green sheets for the insulator layers 10 is arranged so that the order in the stack direction of each configuration formed after the firing is an order of the external electrodes 5, 6, the connection conductors 38, 39, the discharge inducing portion 13, the first and second discharge electrodes 11, 12, the cavity portion 14, and the conductors 21-24 named from the side closer to the side surface 4*c* of the element body 4 which is a mounting surface to a circuit board.

Subsequently, each green chip obtained from the multilayer body of green sheets is polished by barrel polishing (S7). After this polishing, we obtain the green chips with their corners and ridge lines rounded.

After the barrel polishing, the green chips are fired in a predetermined condition (S8). For example, the green chips are fired at 850-950° C. in the atmosphere for two hours. The green chips become the element bodies 4 through the firing. The lacquer for forming cavity vanishes through the firing. This process results in forming the cavity portion 14 covering the whole of the side portions 11*b*, 12*b* of the first and second discharge electrodes 11, 12 and the surface 13*a* of the discharge inducing portion 13 opposed to the coil L1. As a result, the ESD suppressor SP1 configured including the first discharge electrode 11, the second discharge electrode 12, the discharge inducing portion 13, and the cavity portion 14 is formed in the element body 4. Through the process up to this point, we obtain structures each of which has the element body 4 inside which the ESD suppressor SP1 and the coil L1 are arranged, and the external electrodes 5, 6 arranged on the exterior surface of the element body 4. The cavity portion 14 included in the ESD suppressor SP1 is formed so as to cover the whole of the surface 13*a* of the discharge inducing portion 13 opposed to the coil L1, when viewed from the stack direction, between the discharge inducing portion 13 and the coil L1.

Subsequently, a characteristic of the ESD suppressor SP1 is measured (S9). In this process, probes are brought into contact with the respective external electrodes 5, 6 of the foregoing structure obtained above, and then the characteristic of the ESD suppressor SP1 is measured. The characteristic of the ESD suppressor SP1 to be measured is an electric characteristic such as the capacitance and insulation resistance of the ESD suppressor SP1. Since the external electrode 5 is electrically connected to the first discharge electrode 11 and the external electrode 6 is electrically connected to the second discharge electrode 12, the characteristic of the ESD suppressor SP1 can be measured by bringing the probes into contact with the external electrode 5 and the external electrode 6.

Next, a conductor paste for the external electrodes 7, 8 is applied onto each element body 4 (S10). The element body 4 with the conductor paste applied thereto is subjected to a thermal treatment in a predetermined condition to form the external electrodes 7, 8 by sintering (S11). For example, the thermal treatment is carried out at 600-800° C. in the atmosphere for two hours. The external electrode 7 is formed so as to be connected to the one end $E1_1$ of the coil L1 (the end portion 24*a* of the conductor 24) and to the external electrode 5. The external electrode 8 is formed so as to be connected to the other end $E1_2$ of the coil L1 (the end portion 21*a* of the conductor 21) and to the external electrode 6.

Next, characteristic inspection is carried out for each ESD protection component 1 (S12). Particularly, a characteristic of the coil L1 is measured. Since the two ends of the coil L1 are connected to the respective external electrodes 7, 8, the characteristic such as the DC resistance of the coil L1 can be measured by bringing probes into contact with the respective external electrodes 7, 8. Thereafter, the surface of each external electrode 7, 8 is plated (S13). The plating is preferably electrolytic plating and can be carried out, for example, using Ni/Sn, Cu/Ni/Sn, Ni/Pd/Au, Ni/Pd/Ag, Ni/Ag, or the like.

The ESD protection components 1 are obtained through the above process.

Since in the present embodiment the cavity portion 14 is in contact with the gap portion GP1 between the first and second discharge electrodes 11, 12 and with the discharge inducing portion 13, the electric discharge suitably occurs in the gap portion GP1 between the first and second discharge electrodes 11, 12. This allows the ESD protection component 1 to readily ensure the desired ESD absorption capability.

The cavity portion 14 is located so as to cover the whole of the discharge inducing portion 13 when viewed in the stack direction from the coil L1 side. Namely, the cavity portion 14 is located between the coil L1 (internal conductors 21-24) and the discharge inducing portion 13. The cavity portion 14 is formed as a result of vanishment of the lacquer for forming cavity during the process of carrying out the thermal treatment for obtaining the element body 4. The temperature at which the lacquer for forming cavity vanishes is lower than the melting point of the material making up the internal conductors 21-24. Therefore, the cavity portion 14 has been formed before arrival at the state in which the material making up the internal conductors 21-24 can diffuse. Accordingly, the cavity portion 14 is located between the coil L1 (internal conductors 21-24) and the discharge inducing portion 13 even in the state in which the material making up the internal conductors 21-24 can diffuse and, for this reason, the cavity portion 14 prevents the material making up the internal conductors 21-24 from diffusing to the discharge inducing portion 13. As a result, the change in characteristic of the discharge inducing portion 13 is suppressed in the ESD protection component 1.

The cavity portion 14 with the permittivity lower than that of the discharge inducing portion 13 is located between the coil L1 (internal conductors 21-24) and the discharge inducing portion 13. For this reason, the cavity portion 14 reduces the parasitic capacitance occurring due to the permittivity of the discharge inducing portion 13, even in the state in which the discharge inducing portion 13 has the high permittivity because the discharge inducing portion 13 contains the metal particles. As a result, the parasitic capacitance occurring between the coil L1 and the ESD suppressor SP1 can be reduced.

When the melting point of the material making up the internal conductors 21-24 is lower than that of the material making up the metal particles contained in the discharge inducing portion 13, diffusion of the material making up the internal conductors 21-24 is likely to occur. However, since the cavity portion 14 is located so as to cover the whole of the discharge inducing portion 13 when viewed in the stack direction from the coil L1 side, the material making up the internal conductors 21-24 can be surely prevented from reaching the discharge inducing portion 13, even in the state in which the diffusion of the material making up the internal conductors 21-24 is relatively likely to occur.

The first discharge electrode 11 has the first side portion 11b extending in the longitudinal direction of the insulator layer 10, the second discharge electrode 12 has the second side portion 12b extending in the longitudinal direction of the insulator layer 10, and the first and second discharge electrodes 11, 12 are arranged as separated from each other so that the first side portion 11b and the second side portion 12b are opposed to each other. In this case, the first side portion 11b opposed to the second side portion 12b serves as a dischargeable region in the first discharge electrode 11 and the second side portion 12b opposed to the second side portion 12b serves as a dischargeable region in the second discharge electrode 12. The dischargeable regions can be set longer in the configuration in which the first and second discharge electrodes 11, 12 are arranged so that the first and second side portions 11b, 12b are opposed to each other than in the configuration in which the first and second discharge electrodes 11, 12 are arranged so that the end portions 11a, 12a of the first and second discharge electrodes 11, 12 are opposed to each other. The longer the dischargeable regions, the more the durability as ESD protection component 1 improves.

In the present embodiment, after obtaining the structure provided with the element body 4 inside which the ESD suppressor SP1 and the coil L1 are arranged, and with the external electrodes 5, 6 arranged on the exterior surface of the element body 4, the characteristic of the ESD suppressor 10 is measured by bringing the probes into contact with the respective external electrodes 5, 6. Before the formation of the external electrodes 7, 8, the external electrode 5 is not connected to the one end $E1_1$ of the coil L1 and the external electrode 6 is not connected to the other end $E1_1$ of the coil L1. Therefore, the ESD suppressor SP1 and the coil L1 are not connected in parallel, before the formation of the external electrodes 7, 8, and thus the characteristic of the ESD suppressor SP1 can be measured.

In the present embodiment, the characteristic of the coil L1 is measured by bringing the probes into contact with the external electrodes 7, 8, after the formation of the external electrodes 7, 8. After the formation of the external electrodes 7, 8, the ESD suppressor SP1 and the coil L1 are connected in parallel. However, since the first discharge electrode 11 and the second discharge electrode 12 are in a mutually isolated state without application of a surge voltage like ESD, the characteristic of the coil L1 can be measured.

In the present embodiment, the ESD suppressor SP1 and the coil L1 are connected in parallel between the external electrode 7 and the external electrode 8 and the value of DC resistance of the coil L1 is not more than 21Ω. This configuration effectively enhances the suppression effect of the peak voltage and clamp voltage and allows the ESD absorption capability to be effectively improved.

Second Embodiment

Figure 6:
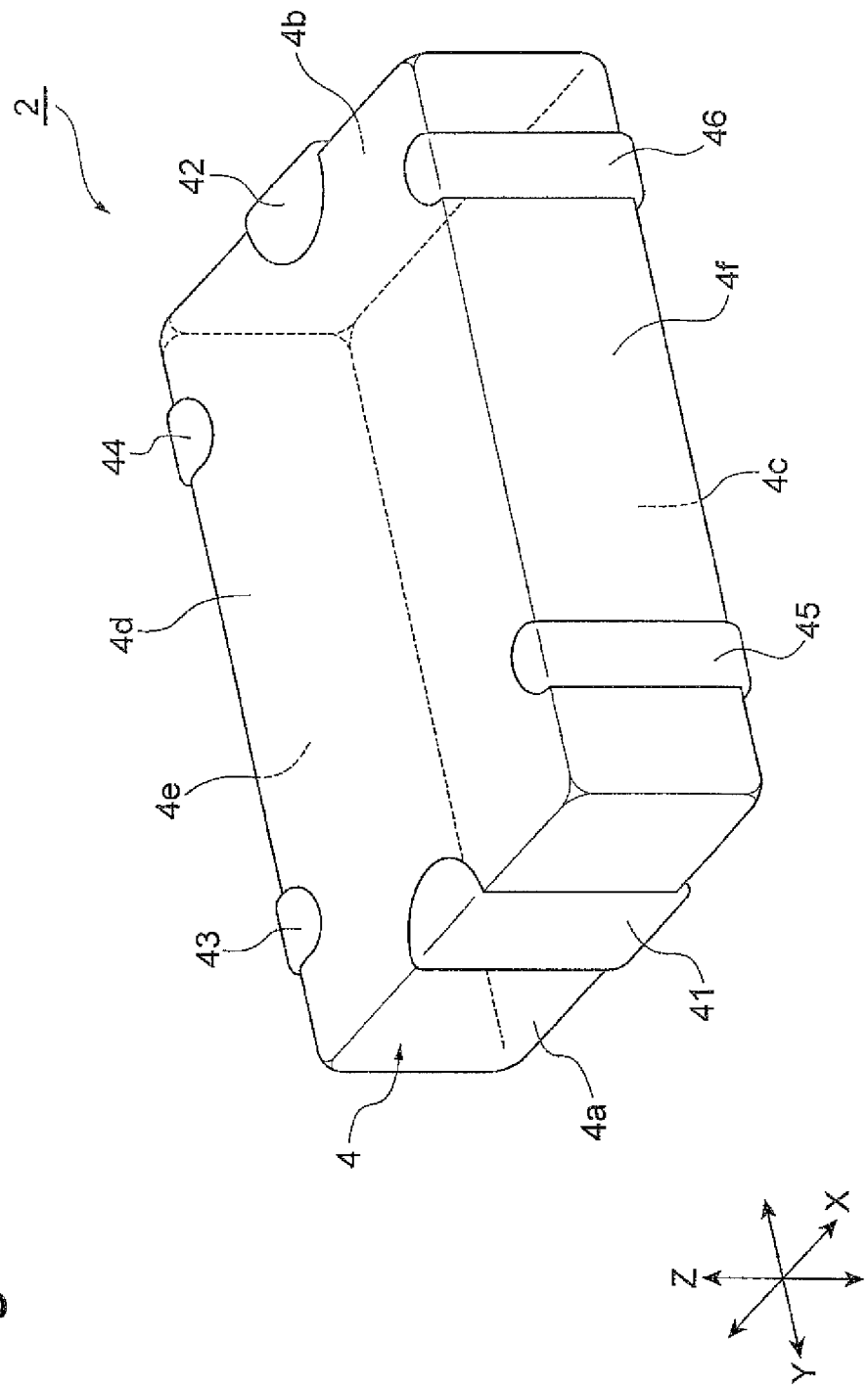
FIG. 6 is a perspective view showing an ESD protection component according to a second embodiment.
Figure 7:
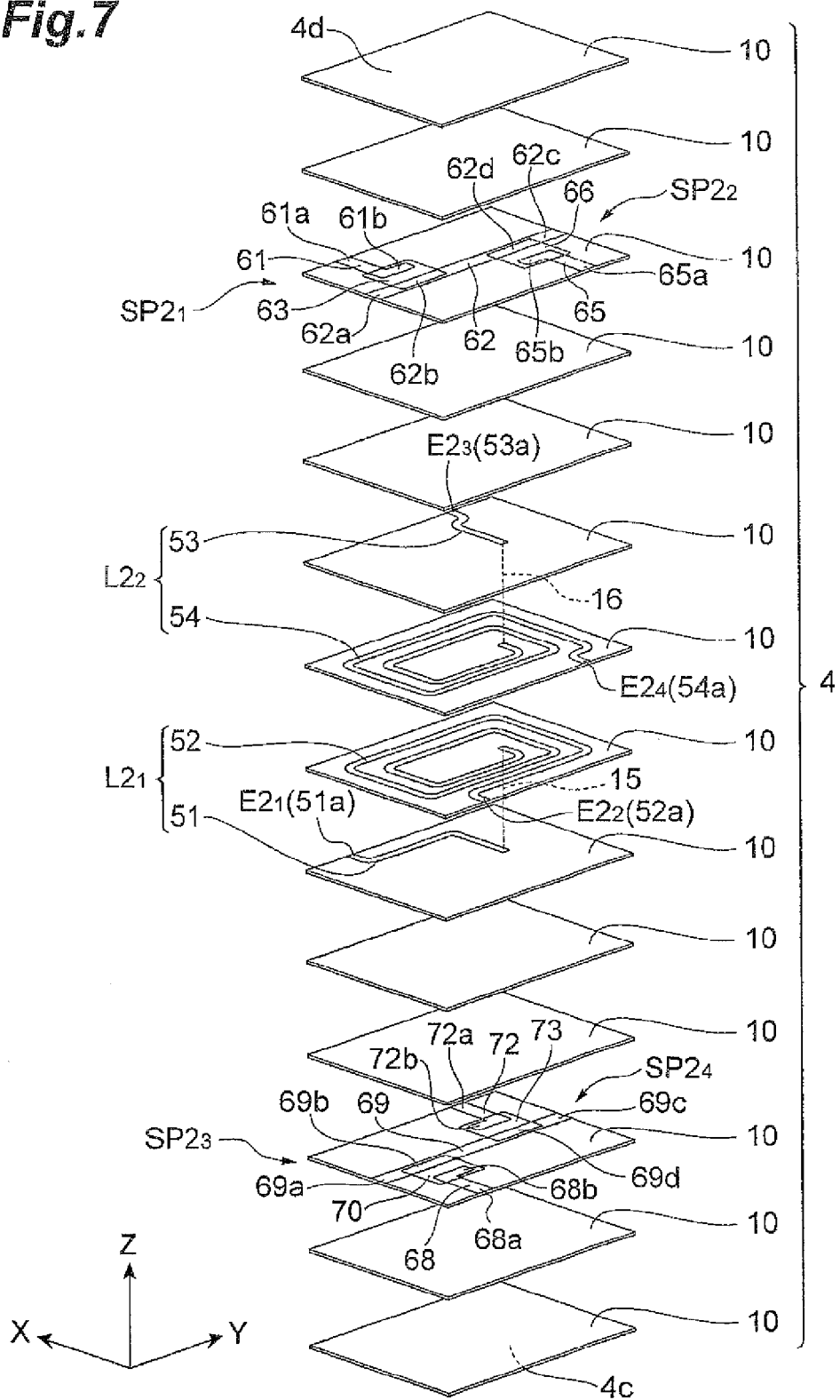
FIG. 7 is an exploded perspective view showing a configuration of an element body.
Figure 8:
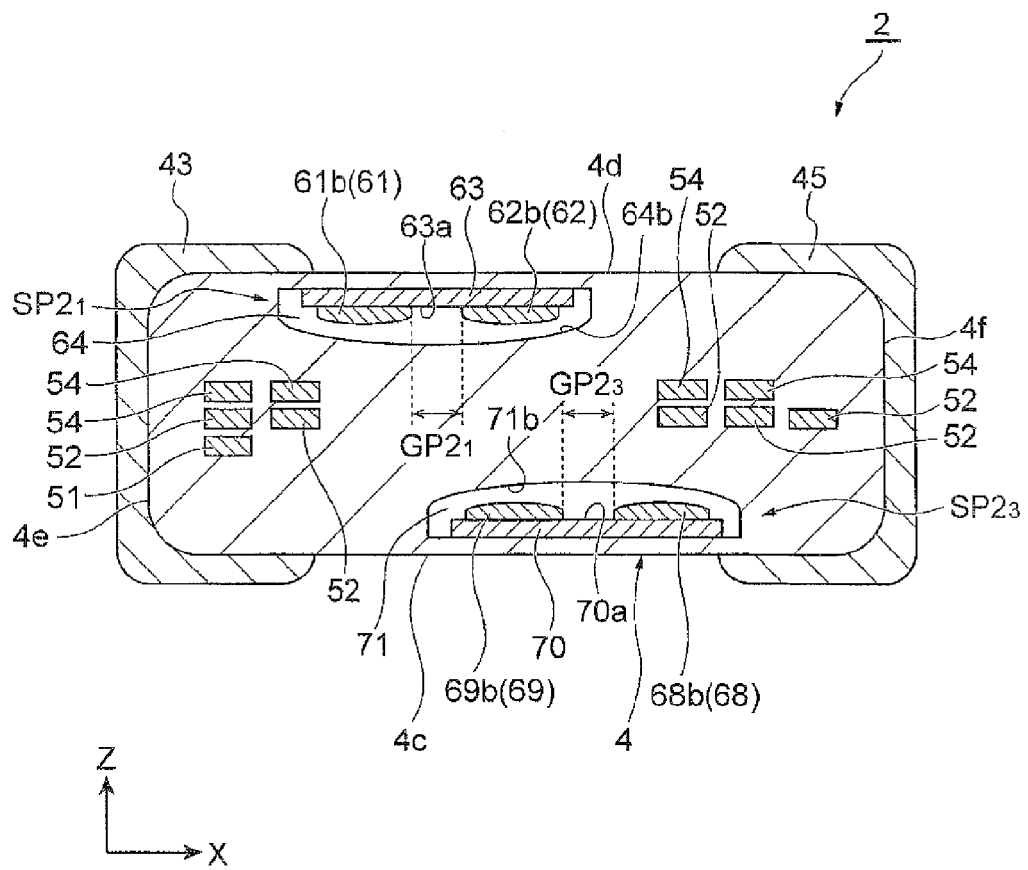
FIG. 8 is a drawing showing a cross-sectional configuration including a first ESD suppressor and a third ESD suppressor, of the ESD protection component according to the second embodiment.
Figure 9:
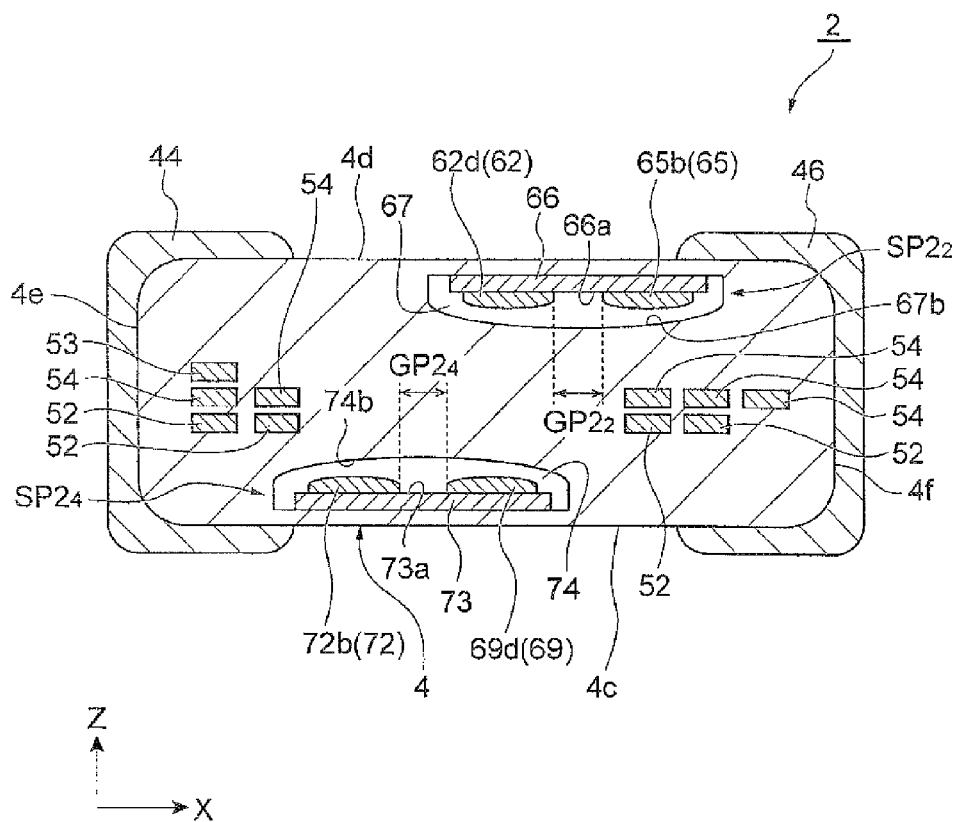
FIG. 9 is a drawing showing a cross-sectional configuration including a second ESD suppressor and a fourth ESD suppressor, of the ESD protection component according to the second embodiment.
Figure 10:
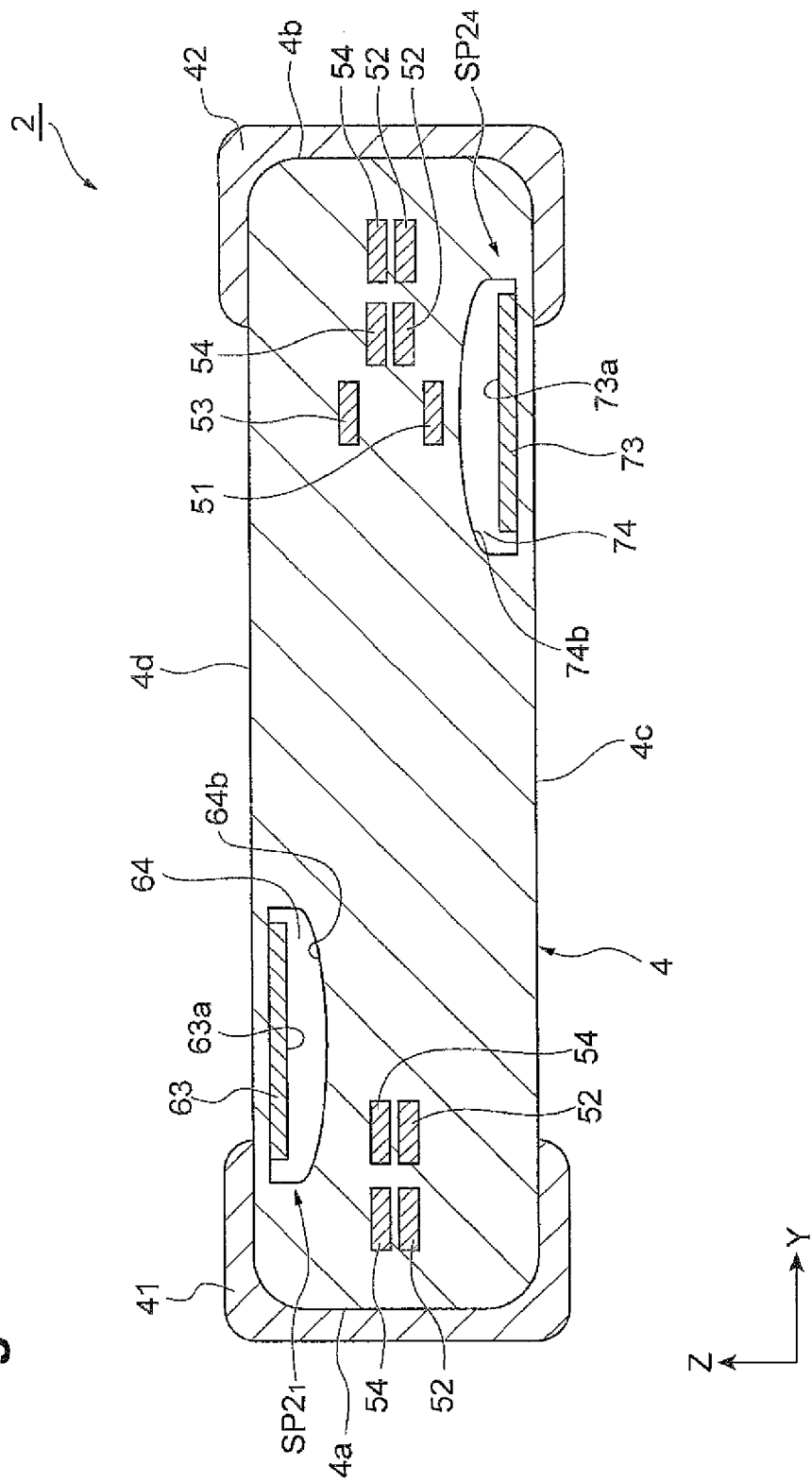
FIG. 10 is a drawing showing a cross-sectional configuration including the first ESD suppressor and the fourth ESD suppressor, of the ESD protection component according to the second embodiment.

Next, a configuration of an ESD protection component 2 according to the second embodiment will be described with reference to FIGS. 6 to 10. FIG. 6 is a perspective view showing the ESD protection component according to the second embodiment. FIG. 7 is an exploded perspective view showing a configuration of an element body. FIG. 8 is a drawing showing a cross-sectional configuration including a first ESD suppressor and a third ESD suppressor, of the ESD protection component according to the second embodiment. FIG. 9 is a drawing showing a cross-sectional configuration including a second ESD suppressor and a fourth ESD suppressor, of the ESD protection component according to the second embodiment. FIG. 10 is a drawing showing a cross-sectional configuration including the first ESD suppressor and the fourth ESD suppressor, of the ESD protection component according to the second embodiment.

The ESD protection component 2, as shown in FIGS. 6 to 10, is provided with the element body 4, an external electrode 41, an external electrode 42, an external electrode 43, an external electrode 44, an external electrode 45, and an external electrode 46 arranged on the exterior surface of the element body 4, a first coil $L2_1$ and a second coil $L2_2$ arranged inside the element body 4, and the first ESD suppressor $SP2_1$, second ESD suppressor $SP2_2$, third ESD suppressor $SP2_3$, and fourth ESD suppressor $SP2_4$ with the ESD absorption capability arranged inside the element body 4.

The element body 4 has a pair of end surfaces 4a, 4b, and four side surfaces 4c, 4d, 4e, and 4f, as its exterior surface. The side surface 4c and side surface 4d are opposed to each other in the stack direction. The side surface 4e and the side surface 4a are opposed to each other in the transverse direction of the element body 4. The external electrode 41 is formed so as to cover a part of the end surface 4a of the element body 4 and have portions being located on the side surface 4c and the side surface 4d adjacent to the end surface 4a. The external electrode 42 is formed so as to cover a part of the end surface 4b of the element body 4 and have portions being located on the side surface 4c and the side surface 4d adjacent to the end surface 4b.

The external electrode 43 and the external electrode 44 are arranged on the side surface 4e adjacent to the end surface 4a of the element body 4. The external electrode 43 is located at an end nearer to the end surface 4a on the side surface 4e. The external electrode 44 is located at an end nearer to the end surface 4b on the side surface 4e. The external electrodes 43 and 44 are formed so as to have portions being located on the side surfaces 4c and 4d adjacent to the side surface 4e of the element body 4.

The external electrode 45 and the external electrode 46 are arranged on the side surface 4f adjacent to the end surface 4a of the element body 4. The external electrode 45 is located at an end nearer to the end surface 4a on the side surface 4f. The external electrode 46 is located at an end nearer to the end surface 4b on the side surface 4f. The external electrodes 45 and 46 are formed so as to have portions being located on the side surfaces 4c and 4d adjacent to the side surface 4f of the element body 4.

The first coil $L2_1$ and the second coil $L2_2$ are arranged in an order of the first coil $L2_1$ and the second coil $L2_2$ named from the side nearer to the side surface 4c of the element body 4, in the stack direction. The coil $L2_1$ is constructed in a configuration in which end portions of conductor 51 and conductor 52 being a plurality of internal conductors are connected by a through-hole conductor 15. The conductor 51 and the conductor 52 are juxtaposed in the stack direction inside the element body 4. The through-hole conductor 15 is located between the conductor 51 and the conductor 52. The conductor 51 has a spiral shape. The conductor 51 and the conductor 52 are juxtaposed in an order of the conductor 51 and the conductor 52 named from the side nearer to the side surface 4c of the element body 4 in the stack direction.

An end portion 51a of the conductor 51 is exposed in the side surface 4e of the element body 4 and is connected to the external electrode 43. An end portion 52a of the conductor 52 is exposed in the side surface 4f of the element body 4 and is connected to the external electrode 45. The end portion 51a of the conductor 51 corresponds to one end $E2_1$ of the first coil $L2_1$ and the end portion 52a of the conductor 52 corresponds to the other end $E2_2$ of the first coil $L2_1$. Therefore, the first coil $L2_1$ is electrically connected to each of the external electrodes 43, 45.

The second coil $L2_2$ is constructed in a configuration in which end portions of conductor 53 and conductor 54 being a plurality of internal conductors are connected by a through-hole conductor 16. The conductor 53 and the conductor 54 are juxtaposed in the stack direction inside the element body 4. The through-hole conductor 16 is located between the conductor 53 and the conductor 54. The conductor 54 has a spiral shape. The conductor 53 and the conductor 54 are juxtaposed in an order of the conductor 53 and the conductor 54 named from the side nearer to the side surface 4d of the element body 4 in the stack direction.

An end portion 53a of the conductor 53 is exposed in the side surface 4e of the element body 4 and is connected to the external electrode 44. An end portion 54a of the conductor 54 is exposed in the side surface 4f of the element body 4 and is connected to the external electrode 46. The end portion 53a of the conductor 53 corresponds to one end $E2_3$ of the second coil $L2_2$ and the end portion 54a of the conductor 54 corresponds to the other end $E2_4$ of the second coil $L2_2$. Therefore, the second coil $L2_2$ is electrically connected to each of the external electrodes 44, 46.

The first coil $L2_1$ and the second coil $L2_2$ constitute a so-called common mode filter while the conductor 52 and the conductor 54 of the spiral shape are magnetically coupled.

The first ESD suppressor $SP2_1$ and the second ESD suppressor $SP2_2$ are arranged on the same insulator layer 10. The first ESD suppressor $SP2_2$ and the second ESD suppressor $SP2_2$ are located on the side surface 4d side of the element body 4 with respect to the second coil $L2_2$ in the stack direction. The first ESD suppressor $SP2_1$ is configured including a first discharge electrode 61 and a second discharge electrode 62, a discharge inducing portion 63, and a cavity portion 64. The first discharge electrode 61 and the second discharge electrode 62 are arranged on the same insulator layer 10 while being separated from each other. The discharge inducing portion 63 connects the first discharge electrode 61 and the second discharge electrode 62. The cavity portion 64 covers the discharge inducing portion 63.

The first discharge electrode 61 has an L-shape extending in the transverse direction and the longitudinal direction of the insulator layer 10. The first discharge electrode 61 includes a region extending in the transverse direction of the insulator layer 10 and has an end portion 61a located in the region. The end portion 61a is exposed in the side surface 4e of the element body 4 and is connected to the external electrode 43. Namely, the first discharge electrode 61 is electrically connected through the external electrode 43 to the one end $E2_1$ of the first coil $L2_1$. The first discharge electrode 61 has a first side portion 61b. The first side portion 61b extends in the longitudinal direction of the insulator layer 10 and is opposed to the second discharge electrode 62.

The second discharge electrode 62 extends in the longitudinal direction of the insulator layer 10. The second discharge electrode 62 has an end portion 62a and a second side portion 62b. The second side portion 62b is opposed to the first side portion 61b of the first discharge electrode 61. The end portion 62a is exposed in the end surface 4a of the element body 4 and connected to the external electrode 41.

The first discharge electrode 61 and the second discharge electrode 62 are arranged as separated from each other so that the first side portion 61b extending in one direction perpendicular to the stack direction is opposed to the second side portion 62b extending in the one direction. By this, a gap portion $GP2_1$ is formed between the first side portion 61b and the second side portion 62b (cf. FIG. 8). When the voltage not less than the predetermined value is applied between the external electrode 41 and the external electrode 43, the electric discharge occurs in the gap portion $GP2_1$ between the first discharge electrode 61 and the second discharge electrode 62.

The discharge inducing portion 63 is located between the first and second discharge electrodes 61 and 62 and the side surface 4d of the element body 4 in the stack direction. The discharge inducing portion 63 is in contact with the first discharge electrode 61 and the second discharge electrode 62 so as to connect the first side portion 61b and the second side portion 62b. Namely, the discharge inducing portion 63 is formed so as to connect mutually opposed portions of the first and second discharge electrodes 61, 62 to each other. The discharge inducing portion 63 has a function to facilitate occurrence of the electric discharge between the first discharge electrode 61 and the second discharge electrode 62.

The element body 4 has the cavity portion 64 (cf. FIGS. 8 and 10). The cavity portion 64 is located between the discharge inducing portion 63 and the second coil $L2_2$. Surfaces defining the cavity portion 64 include a surface 63a where the first and second discharge electrodes 61, 62 in the discharge inducing portion 63 are arranged, and a surface 64b opposed to the surface 63a. The surface 63a is also the surface opposed to the second coil L2$_2$ in the discharge inducing portion 63. The surface 64b is located between the surface 63a and the second coil L2$_2$ in the stack direction. On the surface 63a, the first and second discharge electrodes 61, 62 are formed so that the first and second side portions 61b, 62b being their mutually opposed portions are placed thereon.

The surface 64b opposed to the surface 63a is formed larger than the surface 63a and, when viewed from the stack direction, the surface 64b is formed so as to cover the whole of the surface 63a. Namely, the cavity portion 64 is located so as to cover the whole of the discharge inducing portion 63 when viewed in the stack direction from the second coil L2$_2$ side. Since the surfaces defining the cavity portion 64 include the surface 63a of the discharge inducing portion 63, the cavity portion 64 is in contact with the first side portion 61b and the second side portion 62b located on the surface 63a and with the discharge inducing portion 63. The cavity portion 64 has a function to absorb thermal expansion of the first discharge electrode 61, the second discharge electrode 62, the insulator layers 10, and the discharge inducing portion 63 during the electric discharge.

The second ESD suppressor SP2$_2$ is configured including a first discharge electrode 65 and the second discharge electrode 62, a discharge inducing portion 66, and a cavity portion 67. The first discharge electrode 65 and the second discharge electrode 62 are arranged on the same insulator layer 10 while being separated from each other. The discharge inducing portion 66 connects the first discharge electrode 65 and the second discharge electrode 62. The cavity portion 67 covers the discharge inducing portion 66.

The first discharge electrode 65 has an L-shape extending in the transverse direction and the longitudinal direction of the insulator layer 10. The first discharge electrode 65 includes a region extending in the transverse direction of the insulator layer 10 and has an end portion 65a located in the region. The end portion 65a is exposed in the side surface 4f of the element body 4 and is connected to the external electrode 46. Namely, the first discharge electrode 65 is electrically connected through the external electrode 46 to the other end E2$_4$ of the second coil L2$_2$. The first discharge electrode 65 has a first side portion 65b. The first side portion 65b extends in the longitudinal direction of the insulator layer 10 and is opposed to the second discharge electrode 62.

The second discharge electrode 62 has an end portion 62c and a second side portion 62d. The second side portion 62d is opposed to the first side portion 65b of the first discharge electrode 65. The end portion 62c is exposed in the end surface 4b of the element body 4 and connected to the external electrode 42.

The first discharge electrode 65 and the second discharge electrode 62 are arranged as separated from each other so that the first side portion 65b extending in one direction perpendicular to the stack direction is opposed to the second side portion 62d extending in the one direction. By this, a gap portion GP2$_2$ is formed between the first side portion 65b and the second side portion. 62d (cf. FIG. 9). When the voltage not less than the predetermined value is applied between the external electrode 42 and the external electrode 46, the electric discharge occurs in the gap portion GP2$_2$ between the first discharge electrode 65 and the second discharge electrode 62.

The discharge inducing portion 66 is located between the first and second discharge electrodes 65 and 62 and the side surface 4d of the element body 4 in the stack direction. The discharge inducing portion 66 is in contact with the first discharge electrode 65 and the second discharge electrode 62 so as to connect the first side portion 65b and the second side portion 62d. Namely, the discharge inducing portion 66 is formed so as to connect mutually opposed portions of the first and second discharge electrodes 65, 62 to each other. The discharge inducing portion 66 has a function to facilitate occurrence of the electric discharge between the first discharge electrode 65 and the second discharge electrode 62.

The element body 4 has the cavity portion 67 (cf. FIG. 9). The cavity portion 67 is located between the discharge inducing portion 66 and the second coil L2$_2$. Surfaces defining the cavity portion 67 include a surface 66a where the first and second discharge electrodes 65, 62 in the discharge inducing portion 66 are arranged, and a surface 67b opposed to the surface 66a. The surface 66a is also the surface opposed to the second coil L2$_2$ in the discharge inducing portion 66. The surface 67b is located between the surface 66a and the second coil L2$_2$ in the stack direction. On the surface 66a, the first and second discharge electrodes 65, 62 are formed so that the first and second side portions 65b, 62b being their mutually opposed portions are placed thereon.

The surface 67b opposed to the surface 66a is formed larger than the surface 66a and, when viewed from the stack direction, the surface 67b is formed so as to cover the whole of the surface 66a. Namely, the cavity portion 67 is located so as to cover the whole of the discharge inducing portion 66 when viewed in the stack direction from the second coil L2$_2$ side. Since the surfaces defining the cavity portion 67 include the surface 66a of the discharge inducing portion 66, the cavity portion 67 is in contact with the first side portion 65b and the second side portion 62d located on the surface 66a and with the discharge inducing portion 66. The cavity portion 67 has a function to absorb thermal expansion of the first discharge electrode 65, the second discharge electrode 62, the insulator layers 10, and the discharge inducing portion 66 during the electric discharge.

The third ESD suppressor SP2$_3$ and the fourth ESD suppressor SP2$_4$ are arranged on the same insulator layer 10. The third ESD suppressor SP2$_3$ and the fourth ESD suppressor SP2$_4$ are located on the side surface 4c side of the element body 4 with respect to the first coil L2$_1$ in the stack direction. The third ESD suppressor SP2$_3$ is configured including a first discharge electrode 68 and a second discharge electrode 69, a discharge inducing portion 70, and a cavity portion 71. The first discharge electrode 68 and the second discharge electrode 69 are arranged on the same insulator layer 10 while being separated from each other. The discharge inducing portion 70 connects the first discharge electrode 68 and the second discharge electrode 69. The cavity portion 71 covers the discharge inducing portion 70.

The first discharge electrode 68 has an L-shape extending in the transverse direction and the longitudinal direction of the insulator layer 10. The first discharge electrode 68 includes a region extending in the transverse direction of the insulator layer 10 and has an end portion 68a located in the region. The end portion 68a is exposed in the side surface 4f of the element body 4 and is connected to the external electrode 45. Namely, the first discharge electrode 68 is electrically connected through the external electrode 45 to the other end E2$_2$ of the first coil L2$_1$. The first discharge electrode 68 has a first side portion 68b. The first side portion 68b extends in the longitudinal direction of the insulator layer 10 and is opposed to the second discharge electrode 69.

The second discharge electrode 69 extends in the longitudinal direction of the insulator layer 10. The second discharge electrode 69 has an end portion 69a and a second side portion 69b. The second side portion. 69b is opposed to the first side portion 68b of the first discharge electrode 68. The end portion 69a is exposed in the end surface 4a of the element body 4 and connected to the external electrode 41.

The first discharge electrode 68 and the second discharge electrode 69 are arranged as separated from each other so that the first side portion 68b extending in one direction perpendicular to the stack direction is opposed to the second side portion 69b extending in the one direction. By this, a gap portion $GP2_3$ is formed between the first side portion 68b and the second side portion 69b (cf. FIG. 8). When the voltage not less than the predetermined value is applied between the external electrode 41 and the external electrode 45, the electric discharge occurs in the gap portion $GP2_3$ between the first discharge electrode 68 and the second discharge electrode 69.

The discharge inducing portion 70 is located between the first and second discharge electrodes 68 and 69 and the side surface 4c of the element body 4 in the stack direction. The discharge inducing portion 70 is in contact with the first discharge electrode 68 and the second discharge electrode 69 so as to connect the first side portion 68b and the second side portion 69b. Namely, the discharge inducing portion 70 is formed so as to connect mutually opposed portions of the first and second discharge electrodes 68, 69 to each other. The discharge inducing portion 70 has a function to facilitate occurrence of the electric discharge between the first discharge electrode 68 and the second discharge electrode 69.

The element body 4 has the cavity portion 71 (cf. FIG. 8). The cavity portion 71 is located between the discharge inducing portion 70 and the first coil $L2_1$. Surfaces defining the cavity portion 71 include a surface 70a where the first and second discharge electrodes 68, 69 in the discharge inducing portion 70 are arranged, and a surface 71b opposed to the surface 70a. The surface 70a is also the surface opposed to the first coil $L2_1$ in the discharge inducing portion 70. The surface 71b is located between the surface 70a and the first coil $L2_1$ in the stack direction. On the surface 70a, the first and second discharge electrodes 68, 69 are formed so that the first and second side portions 68b, 69b being their mutually opposed portions are placed thereon.

The surface 71b opposed to the surface 70a is formed larger than the surface 70a and, when viewed from the stack direction, the surface 71b is formed so as to cover the whole of the surface 70a. Namely, the cavity portion 71 is located so as to cover the whole of the discharge inducing portion 70 when viewed in the stack direction from the first coil $L2_1$ side. Since the surfaces defining the cavity portion 71 include the surface 70a of the discharge inducing portion 70, the cavity portion 71 is in contact with the first side portion 68b and the second side portion 69b located on the surface 70a and with the discharge inducing portion 70. The cavity portion 71 has a function to absorb thermal expansion of the first discharge electrode 68, the second discharge electrode 69, the insulator layers 10, and the discharge inducing portion 70 during the electric discharge.

The fourth ESD suppressor $SP2_4$ is configured including a first discharge electrode 72 and the second discharge electrode 69, a discharge inducing portion 73, and a cavity portion 74. The first discharge electrode 72 and the second discharge electrode 69 are arranged on the same insulator layer 10 while being separated from each other. The discharge inducing portion 73 connects the first discharge electrode 72 and the second discharge electrode 69. The cavity portion 74 covers the discharge inducing portion 73.

The first discharge electrode 72 has an L-shape extending in the transverse direction and the longitudinal direction of the insulator layer 10. The first discharge electrode 72 includes a region extending in the transverse direction of the insulator layer 10 and has an end portion 72a located in the region. The end portion 72a is exposed in the side surface 4e of the element body 4 and is connected to the external electrode 44. Namely, the first discharge electrode 72 is electrically connected through the external electrode 44 to the one end $E2_3$ of the second coil $L2_2$. The first discharge electrode 72 has a first side portion 72b. The first side portion 72b extends in the longitudinal direction of the insulator layer 10 and is opposed to the second discharge electrode 69.

The second discharge electrode 69 has an end portion 69c and a second side portion 69d. The second side portion 69d is opposed to the first side portion 72b of the first discharge electrode 72. The end portion 69c is exposed in the end surface 4b of the element body 4 and connected to the external electrode 42.

The first discharge electrode 72 and the second discharge electrode 69 are arranged as separated from each other so that the first side portion 72b extending in one direction perpendicular to the stack direction is opposed to the second side portion 69d extending in the one direction. By this, a gap portion $GP2_4$ is formed between the first side portion 72b and the second side portion 69d (cf. FIG. 9). When the voltage not less than the predetermined value is applied between the external electrode 42 and the external electrode 44, the electric discharge occurs in the gap portion $GP2_4$ between the first discharge electrode 72 and the second discharge electrode 69.

The discharge inducing portion 73 is located between the first and second discharge electrodes 72 and 69 and the side surface 4c of the element body 4 in the stack direction. The discharge inducing portion 73 is in contact with the first discharge electrode 72 and the second discharge electrode 69 so as to connect the first side portion 72b and the second side portion 69d. Namely, the discharge inducing portion 73 is formed so as to connect mutually opposed portions of the first and second discharge electrodes 72, 69 to each other. The discharge inducing portion 73 has a function to facilitate occurrence of the electric discharge between the first discharge electrode 72 and the second discharge electrode 69.

The element body 4 has the cavity portion 74 (cf. FIGS. 9 and 10). The cavity portion 74 is located between the discharge inducing portion 73 and the first coil $L2_1$. Surfaces defining the cavity portion 74 include a surface 73a where the first and second discharge electrodes 72, 69 in the discharge inducing portion 73 are arranged, and a surface 74b opposed to the surface 73a. The surface 73a is also the surface opposed to the first coil $L2_1$ in the discharge inducing portion 73. The surface 74b is located between the surface 73a and the first coil $L2_1$ in the stack direction. On the surface 73a, the first and second discharge electrodes 72, 69 are formed so that the first and second side portions 72b, 69d being their mutually opposed portions are placed thereon.

The surface 74b opposed to the surface 73a is formed larger than the surface 73a and, when viewed from the stack direction, the surface 74b is formed so as to cover the whole of the surface 73a. Namely, the cavity portion 74 is located so as to cover the whole of the discharge inducing portion 73 when viewed in the stack direction from the first coil $L2_1$ side. Since the surfaces defining the cavity portion 74 include the surface 73a of the discharge inducing portion 73, the cavity portion 74 is in contact with the first side portion 72b and the second side portion 69d located on the surface 73a and with the discharge inducing portion 73. The cavity portion 74 has a function to absorb thermal expansion of the first discharge electrode 72, the second discharge electrode 69, the insulator layers 10, and the discharge inducing portion 73 during the electric discharge.

In the present second embodiment, as described above, the cavity portion 64 is located so as to cover the whole of the discharge inducing portion 63 and the cavity portion 67 is located so as to cover the whole of the discharge inducing portion 66, when viewed in the stack direction from the second coil $L2_2$ side, in the same manner as in the aforementioned first embodiment. When viewed in the stack direction from the first coil $L2_1$ side, the cavity portion 71 is located so as to cover the whole of the discharge inducing portion 70 and the cavity portion 74 is located so as to cover the whole of the discharge inducing portion 73. Therefore, each cavity portion 64, 67, 71, or 74 is located between the first and second coils $L2_1$ and $L2_2$ (internal conductors 51-54) and each discharge inducing portion 63, 66, 70, or 73. Therefore, even in the state in which the material making up the internal conductors 51-54 can diffuse, each cavity portion 64, 67, 71, or 74 prevents the material making up the internal conductors 51-54 from diffusing to each discharge inducing portion 63, 66, 70, or 73. As a result, the change in characteristic of the discharge inducing portions 63, 66, 70, and 73 is suppressed in the ESD protection component 2.

Each cavity portion 64, 67, 71, or 75 with the permittivity lower than that of each discharge inducing portion 63, 66, 70, 73 is located between the first and second coils $L2_1$ and $L2_2$ (internal conductors 51-54) and each discharge inducing portion 63, 66, 70, 73. Therefore, even in the state in which each discharge inducing portion 63, 66, 70, 73 has the high permittivity because it contains the metal particles, the cavity portions 64, 67, 71, 74 reduce the parasitic capacitance occurring due to the permittivity of the discharge inducing portions 63, 66, 70, 73. As a result, it is feasible to reduce the parasitic capacitance occurring between the first coil $L2_1$ and the third and fourth ESD suppressors $SP2_3$ and $SP2_4$ and to reduce the parasitic capacitance occurring between the second coil $L2_2$ and the first and second ESD suppressors $SP2_1$ and $SP2_2$.

Third Embodiment

Figure 11:
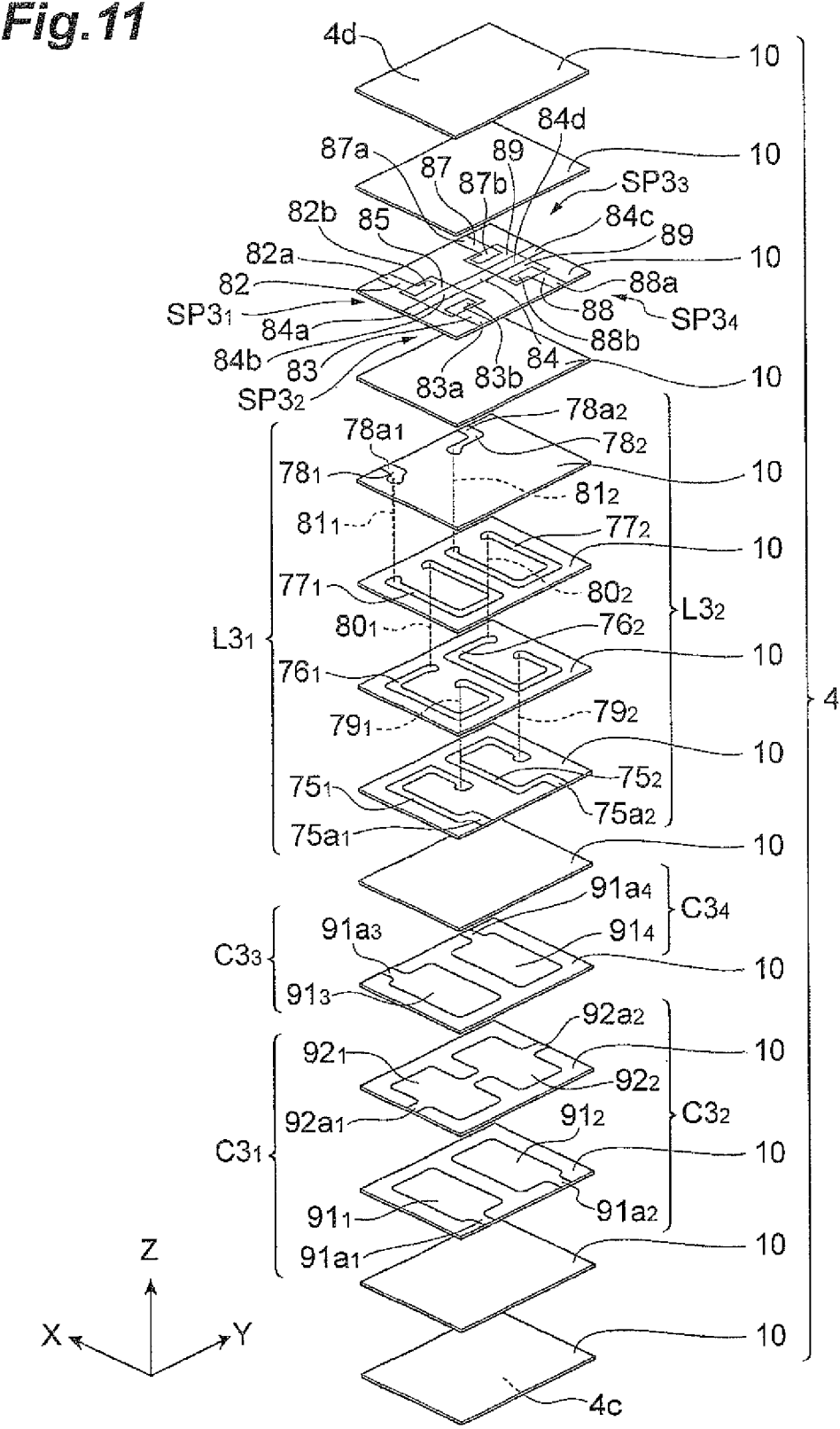
FIG. 11 is an exploded perspective view showing a configuration of an element body which an ESD protection component according to a third embodiment has.
Figure 12:
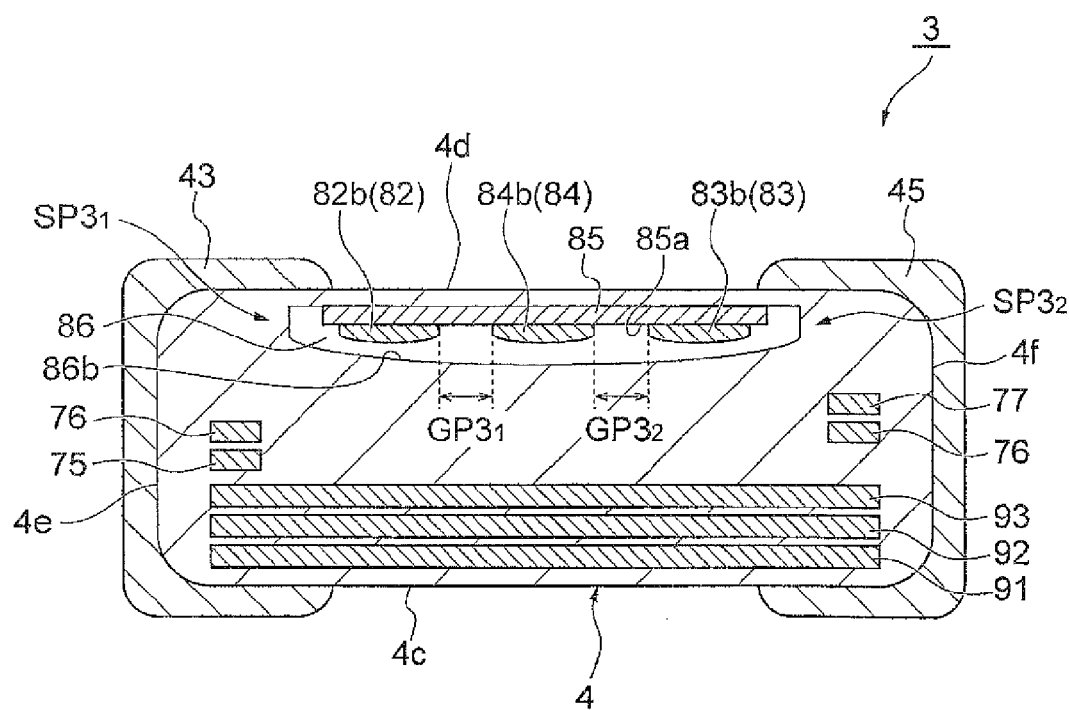
FIG. 12 is a drawing showing a cross-sectional configuration including a first ESD suppressor and a second ESD suppressor, of the ESD protection component according to the third embodiment.
Figure 13:
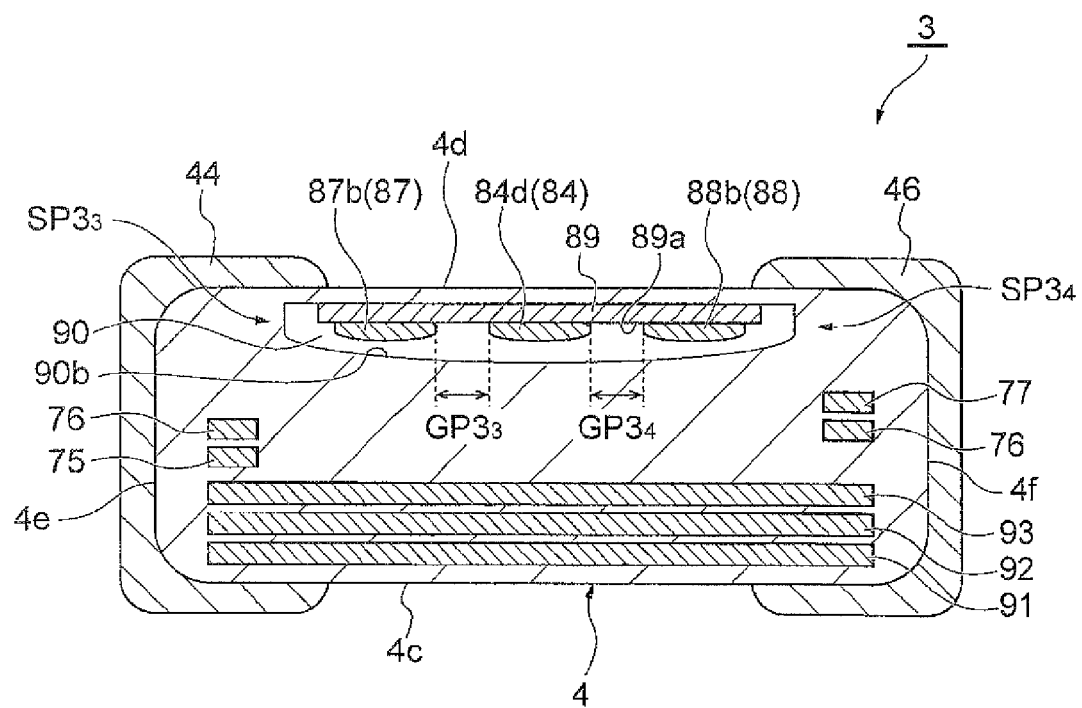
FIG. 13 is a drawing showing a cross-sectional configuration including a third ESD suppressor and a fourth ESD suppressor, of the ESD protection component according to the third embodiment.
Figure 14:
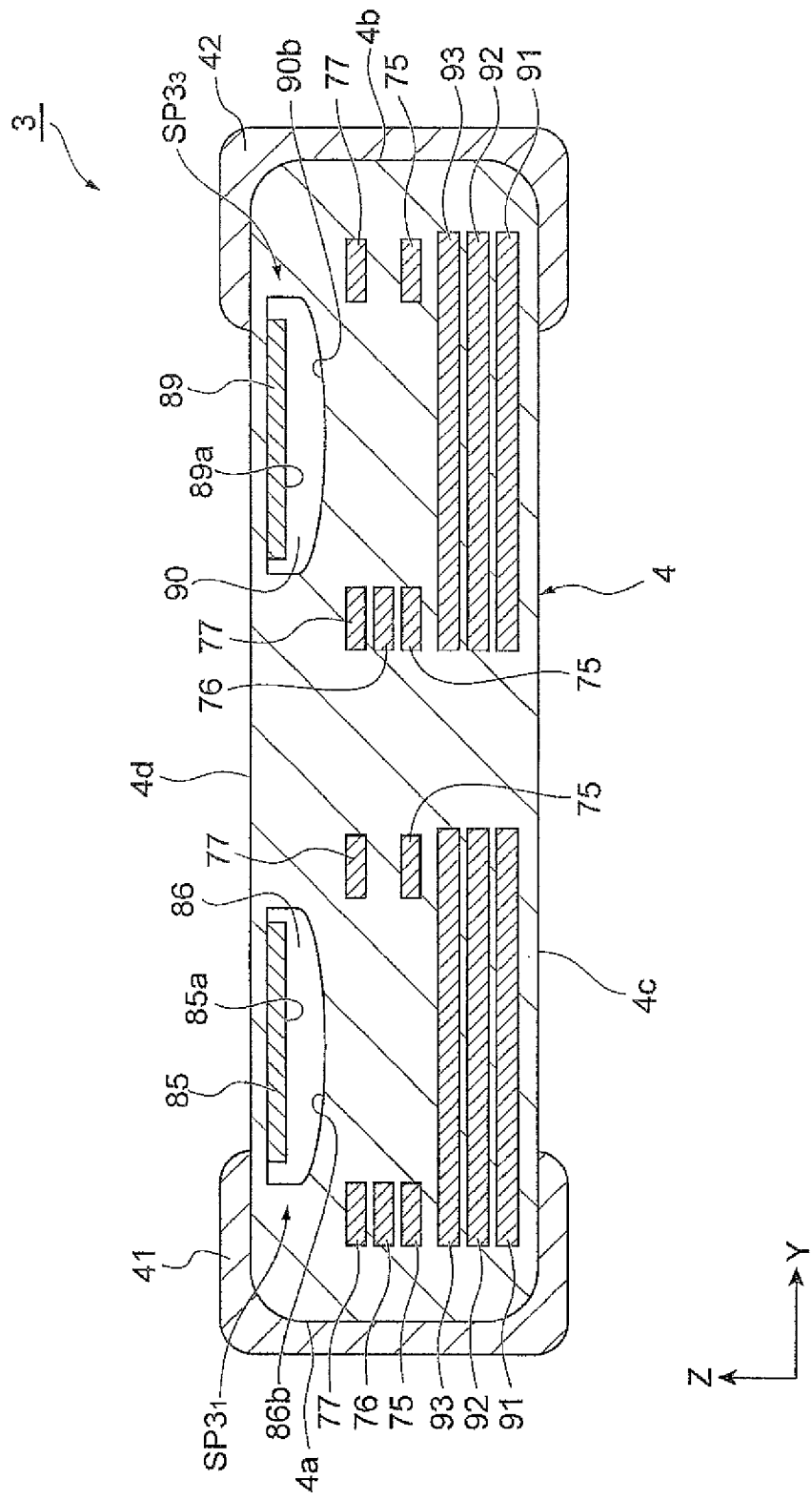
FIG. 14 is a drawing showing a cross-sectional configuration including the first ESD suppressor and the third ESD suppressor, of the ESD protection component according to the third embodiment.

Next, a configuration of an ESD protection component 3 according to the third embodiment will be described with reference to FIGS. 6 and 11 to 13. FIG. 11 is an exploded perspective view showing a configuration of an element body which the ESD protection component according to the third embodiment has. FIG. 12 is a drawing showing a cross-sectional configuration including a first ESD suppressor and a second ESD suppressor, of the ESD protection component according to the third embodiment. FIG. 13 is a drawing showing a cross-sectional configuration including a third ESD suppressor and a fourth ESD suppressor, of the ESD protection component according to the third embodiment. FIG. 14 is a drawing showing a cross-sectional configuration including the first ESD suppressor and the third ESD suppressor, of the ESD protection component according to the third embodiment.

The ESD protection component 3 is provided with the element body 4, and the external electrode 41, the external electrode 42, the external electrode 43, the external electrode 44, the external electrode 45, and the external electrode 46 arranged on the exterior surface of the element body 4 as the ESD protection component 2 shown in FIG. 6 is. The ESD protection component 3, as shown in FIGS. 11 to 13, is provided with a first coil $L3_1$ and a second coil $L3_2$ arranged inside the element body 4, the first ESD suppressor $SP3_1$, second ESD suppressor $SP3_2$, third ESD suppressor $SP3_3$, and fourth ESD suppressor $SP3_4$ with the ESD absorption capability arranged inside the element body 4, and a first capacitor $C3_1$, a second capacitor $C3_2$, a third capacitor $C3_3$, and a fourth capacitor $C3_4$ arranged inside the element body 4. The configurations of the element body 4 and the external electrodes 41-46 are the same as in the ESD protection component 2 according to the second embodiment.

The first coil $L3_1$ and the second coil $L3_2$ are formed between the first to fourth ESD suppressors $SP3_1$, $SP3_2$, $SP3_3$, $SP3_4$ and the first to fourth capacitors $C3_1$, $C3_2$, $C3_3$, $C3_4$ in the stack direction. The first coil $L3_1$ is constructed by connecting end portions of conductor $75_1$, conductor $76_1$, conductor $77_1$, and conductor $78_1$ being a plurality of internal conductors to each other by respective through-hole conductors $79_1$-$81_1$. The conductor $75_1$, conductor $76_1$, conductor $77_1$, and conductor $78_1$ are juxtaposed in the stack direction inside the element body 4. Each through-hole conductor $79_1$-$81_1$ is located between the corresponding conductors $75_1$-$78_1$. The conductors $75_1$-$78_1$ are juxtaposed in an order of the conductor $75_1$, the conductor $76_1$, the conductor $77_1$, and the conductor $78_1$ named from the side nearer to the side surface 4c of the element body 4 in the stack direction.

The through-hole conductor $79_1$ is located between the conductor $75_1$ and the conductor $76_1$ and electrically connects the conductor $75_1$ and the conductor $76_1$. The through-hole conductor $80_1$ is located between the conductor $76_1$ and the conductor $77_1$ and electrically connects the conductor $76_1$ and the conductor $77_1$. The through-hole conductor $81_1$ is located between the conductor $77_1$ and the conductor $78_1$ and electrically connects the conductor $77_1$ and the conductor $78_1$. Each of the through-hole conductors $79_1$-$81_1$ functions as a part of the first coil $L3_1$.

An end portion $78a_1$ of the conductor $78_1$ is exposed in the side surface 4e of the element body 4 and connected to the external electrode 43. An end portion $75a_1$ of the conductor $75_1$ is exposed in the side surface 4f of the element body 4 and connected to the external electrode 45. The end portion $78a_1$ of the conductor $78_1$ corresponds to one end $E3_1$ of the first coil $L3_1$ and the end portion $75a_1$ of the conductor $75_1$ corresponds to the other end $E3_2$ of the first coil $L3_1$. Therefore, the first coil $L3_1$ is electrically connected to each of the external electrodes 43, 45.

The second coil $L3_2$ is constructed by connecting end portions of conductor $75_2$, conductor $76_2$, conductor $77_2$, and conductor $78_2$ being a plurality of internal conductors to each other by respective through-hole conductors $79_2$-$81_2$. The conductor $75_2$, conductor $76_2$, conductor $77_2$, and conductor $78_2$ are juxtaposed in the stack direction inside the element body 4. Each through-hole conductor $79_2$-$81_2$ is located between the corresponding conductors $75_2$-$78_2$. Each conductor $75_2$-$78_2$ is arranged on the same insulator layer 10 as each conductor $75_1$-$78_1$, respectively, is. The conductors $75_2$-$78_2$ are juxtaposed in an order of the conductor $75_2$, the conductor $76_2$, the conductor $77_2$, and the conductor $78_2$ from the side nearer to the side surface 4c of the element body 4 in the stack direction.

The through-hole conductor $79_2$ is located between the conductor $75_2$ and the conductor $76_2$ and electrically connects the conductor $75_2$ and the conductor $76_2$. The through-hole conductor $80_2$ is located between the conductor $76_2$ and the conductor $77_2$ and electrically connects the conductor $76_2$ and the conductor $77_2$. The through-hole conductor $81_2$ is located between the conductor $77_2$ and the conductor $78_2$ and electrically connects the conductor $77_2$ and the conductor $78_2$. Each of the through-hole conductors $79_2$-$81_2$ functions as a part of the second coil $L3_2$.

An end portion $78a_2$ of the conductor $78_2$ is exposed in the side surface 4e of the element body 4 and connected to the external electrode 44. An end portion $75a_2$ of the conductor $75_2$ is exposed in the side surface 4f of the element body 4 and connected to the external electrode 46. The end portion $78a_2$ of the conductor $78_2$ corresponds to one end $E3_3$ of the second coil $L3_2$ and the end portion $75a_2$ of the conductor $75_2$ corresponds to the other end E3₄ of the second coil L3₂. Therefore, the second coil L3₂ is electrically connected to each of the external electrodes 44, 46.

The first ESD suppressor SP3₁, the second ESD suppressor SP3₂, the third ESD suppressor SP3₃, and the fourth ESD suppressor SP3₄ are arranged on the same insulator layer 10. The first ESD suppressor SP3₁, the second ESD suppressor SP3₂, the third ESD suppressor SP3₃, and the fourth ESD suppressor SP3₄ are located on the side surface 4d side of the element body 4 with respect to the first coil L3₁ and the second coil L3₂ in the stack direction. The first ESD suppressor SP3₁ is configured including a first discharge electrode 82 and a second discharge electrode 84, a discharge inducing portion 85, and a cavity portion 86. The first discharge electrode 82 and the second discharge electrode 84 are arranged on the same insulator layer 10 while being separated from each other. The discharge inducing portion 85 connects the first discharge electrode 82 and the second discharge electrode 84. The cavity portion 86 covers the discharge inducing portion 85. The second ESD suppressor SP3₂ is configured including a first discharge electrode 83 and the second discharge electrode 84, the discharge inducing portion 85, and the cavity portion 86. The first discharge electrode 83 and the second discharge electrode 84 are arranged on the same insulator layer 10 while being separated from each other. The discharge inducing portion 85 connects the first discharge electrode 83 and the second discharge electrode 84. The cavity portion 86 covers the discharge inducing portion 85.

The first discharge electrode 82 has an L-shape extending in the transverse direction and the longitudinal direction of the insulator layer 10. The first discharge electrode 82 includes a region extending in the transverse direction of the insulator layer 10 and has an end portion 82a located in the region. The end portion 82a is exposed in the side surface 4e of the element body 4 and is connected to the external electrode 43. Namely, the first discharge electrode 82 is electrically connected through the external electrode 43 to the one end E3₁ of the first coil L3₁. The first discharge electrode 82 has a first side portion 82b. The first side portion 82b extends in the longitudinal direction of the insulator layer 10 and is opposed to the second discharge electrode 84.

The first discharge electrode 83 has an L-shape extending in the transverse direction and the longitudinal direction of the insulator layer 10. The first discharge electrode 83 includes a region extending in the transverse direction of the insulator layer 10 and has an end portion 83a located in the region. The end portion 83a is exposed in the side surface 4f of the element body 4 and is connected to the external electrode 45. Namely, the first discharge electrode 83 is electrically connected through the external electrode 45 to the other end E3₂ of the first coil L3₁. The first discharge electrode 83 has a first side portion 83b. The first side portion 83b extends in the longitudinal direction of the insulator layer 10 and is opposed to the second discharge electrode 84.

The second discharge electrode 84 extends in the longitudinal direction of the insulator layer 10. The second discharge electrode 84 has an end portion 84a and a side portion 84b. The side portion 84b is opposed to the first side portions 82b, 83b of the respective first discharge electrodes 82, 83. The end portion 84a is exposed in the end surface 4a of the element body 4 and connected to the external electrode 41.

The first discharge electrode 82 and the second discharge electrode 84 are arranged as separated from each other so that the first side portion 82b extending in one direction perpendicular to the stack direction is opposed to the second side portion 84b extending in the one direction. By this, a gap portion GP3₁ is formed between the first side portion 82b and the second side portion 84b (cf. FIG. 12). When the voltage not less than the predetermined value is applied between the external electrode 41 and the external electrode 43, the electric discharge occurs in the gap portion GP3₁ between the first discharge electrode 82 and the second discharge electrode 84.

The first discharge electrode 83 and the second discharge electrode 84 are arranged as separated from each other so that the first side portion 83b extending in one direction perpendicular to the stack direction is opposed to the second side portion 84b extending in the one direction. By this, a gap portion GP3₂ is formed between the first side portion 83b and the second side portion 84b (cf. FIG. 12). When the voltage not less than the predetermined value is applied between the external electrode 41 and the external electrode 45, the electric discharge occurs in the gap portion GP3₂ between the first discharge electrode 83 and the second discharge electrode 84.

The discharge inducing portion 85 is located between the first discharge electrodes 82, 83 and second discharge electrode 84, and the side surface 4d of the element body 4 in the stack direction. The discharge inducing portion 85 is in contact with each of the first discharge electrodes 82, 83 and the second discharge electrode 84 so as to connect the first side portions 82b, 83b of the respective first discharge electrodes 82, 83 and the second side portion 84b of the second discharge electrode 84. Namely, the discharge inducing portion 85 is formed so as to connect mutually opposed portions of each first discharge electrode 82, 83 and the second discharge electrode 84 to each other. The discharge inducing portion 85 has a function to facilitate occurrence of the electric discharge between each of the first discharge electrodes 82, 83 and the second discharge electrode 84.

The element body 4 has the cavity portion 86 (cf. FIGS. 12 and 14). The cavity portion 86 is located between the discharge inducing portion 85 and the first and second coils L3₁ and L3₂. Surfaces defining the cavity portion 86 include a surface 85a where the first discharge electrodes 82, 83 and the second discharge electrode 84 in the discharge inducing portion 85 are arranged, and a surface 86b opposed to the surface 85a. The surface 85a is also the surface opposed to the first coil L3₁ and the second coil L3₂ in the discharge inducing portion 85. The surface 86b is located between the surface 85a and the first and second coils L3₁, L3₂ in the stack direction. On the surface 85a, the first discharge electrodes 82, 83 and the second discharge electrode 84 are formed so that the first side portions 82b, 83b and the second side portion 84b, 62b being their mutually opposed portions are placed thereon.

The surface 86b opposed to the surface 85a is formed larger than the surface 85a and, when viewed from the stack direction, the surface 86b is formed so as to cover the whole of the surface 85a. Namely, the cavity portion 86 is located so as to cover the whole of the discharge inducing portion 85 when viewed in the stack direction from the first coil L3₁ and second coil L3₂ side. Since the surfaces defining the cavity portion 86 include the surface 85a of the discharge inducing portion 85, the cavity portion 86 is in contact with the first side portion 82b and second side portion 84b and the first side portion 83b and second side portion 84b located on the surface 85a and with the discharge inducing portion 85. The cavity portion 86 has a function to absorb thermal expansion of the first discharge electrodes 82, 83, the second discharge electrode 84, the insulator layers 10, and the discharge inducing portion 85 during the electric discharge.

The third ESD suppressor SP3₃ is configured including a first discharge electrode 87 and the second discharge electrode 84, a discharge inducing portion 89, and a cavity portion 90. The first discharge electrode 87 and the second discharge electrode 84 are arranged on the same insulator layer 10 while being separated from each other. The discharge inducing portion 89 connects the first discharge electrode 87 and the second discharge electrode 84. The cavity portion 90 covers the discharge inducing portion 89. The fourth ESD suppressor $SP3_4$ is configured including a first discharge electrode 88 and the second discharge electrode 84, the discharge inducing portion 89, and the cavity portion 90. The first discharge electrode 88 and the second discharge electrode 84 are arranged on the same insulator layer 10 while being separated from each other. The discharge inducing portion 89 connects the first discharge electrode 88 and the second discharge electrode 84. The cavity portion 90 covers the discharge inducing portion 89.

The first discharge electrode 87 has an L-shape extending in the transverse direction and the longitudinal direction of the insulator layer 10. The first discharge electrode 87 includes a region extending in the transverse direction of the insulator layer 10 and has an end portion 87a located in the region. The end portion 87a is exposed in the side surface 4e of the element body 4 and is connected to the external electrode 44. Namely, the first discharge electrode 87 is electrically connected through the external electrode 44 to the one end $E3_3$ of the second coil $L3_2$. The first discharge electrode 87 has a first side portion 87b. The first side portion 87b extends in the longitudinal direction of the insulator layer 10 and is opposed to the second discharge electrode 84.

The first discharge electrode 88 has an L-shape extending in the transverse direction and the longitudinal direction of the insulator layer 10. The first discharge electrode 88 includes a region extending in the transverse direction of the insulator layer 10 and has an end portion 88a located in the region. The end portion 88a is exposed in the side surface 4f of the element body 4 and is connected to the external electrode 46. Namely, the first discharge electrode 88 is electrically connected through the external electrode 46 to the other end $E3_4$ of the second coil $L3_2$. The first discharge electrode 88 has a first side portion 88b. The first side portion 88b extends in the longitudinal direction of the insulator layer 10 and is opposed to the second discharge electrode 84.

The second discharge electrode 84 extends in the longitudinal direction of the insulator layer 10. The second discharge electrode 84 has an end portion 84c and a second side portion 84d. The second side portion 84d is opposed to each of the first side portions 87b, 88b of the respective first discharge electrodes 87, 88. The end portion 84c is exposed in the end surface 4b of the element body 4 and connected to the external electrode 42.

The first discharge electrode 87 and the second discharge electrode 84 are arranged as separated from each other so that the first side portion 87b extending in one direction perpendicular to the stack direction is opposed to the second side portion 84d extending in the one direction. By this, a gap portion $GP3_3$ is formed between the first side portion 87b and the second side portion 84d (cf. FIG. 13). When the voltage not less than the predetermined value is applied between the external electrode 42 and the external electrode 44, the electric discharge occurs in the gap portion $GP3_3$ between the first discharge electrode 87 and the second discharge electrode 84.

The first discharge electrode 88 and the second discharge electrode 84 are arranged as separated from each other so that the first side portion 88b extending in one direction perpendicular to the stack direction is opposed to the second side portion 84d extending in the one direction. By this, a gap portion $GP3_4$ is formed between the first side portion 88b and the second side portion 84d (cf. FIG. 13). When the voltage not less than the predetermined value is applied between the external electrode 42 and the external electrode 46, the electric discharge occurs in the gap portion $GP3_4$ between the first discharge electrode 88 and the second discharge electrode 84.

The discharge inducing portion 89 is located between the first discharge electrodes 87, 88 and second discharge electrode 84, and the side surface 4d of the element body 4 in the stack direction. The discharge inducing portion 89 is in contact with each of the first discharge electrodes 87, 88 and the second discharge electrode 84 so as to connect the first side portions 87b, 88b of the respective first discharge electrodes 87, 88 and the second side portion 84d of the second discharge electrode 84. Namely, the discharge inducing portion 89 is formed so as to connect mutually opposed portions of the first discharge electrodes 87, 88 and the second discharge electrode 84 to each other. The discharge inducing portion 89 has a function to facilitate occurrence of the electric discharge between each of the first discharge electrodes 87, 88 and the second discharge electrode 84.

The element body 4 has the cavity portion 90 (cf. FIGS. 13 and 14). The cavity portion 90 is located between the discharge inducing portion 89 and the first and second coils $L3_1$ and $L3_2$. Surfaces defining the cavity portion 90 include a surface 89a where the first discharge electrodes 87, 88 and the second discharge electrode 84 in the discharge inducing portion 89 are arranged, and a surface 90b opposed to the surface 89a. The surface 89a is also the surface opposed to the first coil $L3_1$ and the second coil $L3_2$ in the discharge inducing portion 89. The surface 90b is located between the surface 89a and the first and second coils $L3_1$, $L3_2$ in the stack direction. On the surface 89a, the first discharge electrodes 87, 88 and the second discharge electrode 84 are formed so that the first side portions 87b, 88b and the second side portion 84d being their mutually opposed portions are placed thereon.

The surface 90b opposed to the surface 89a is thrilled larger than the surface 89a and, when viewed from the stack direction, the surface 90b is formed so as to cover the whole of the surface 89a. Namely, the cavity portion 90 is located so as to cover the whole of the discharge inducing portion 89 when viewed in the stack direction from the first coil $L3_1$ and second coil $L3_2$ side. Since the surfaces defining the cavity portion 90 include the surface 89a of the discharge inducing portion 89, the cavity portion 90 is in contact with the first side portion 87b and second side portion 84d and the first side portion 88b and second side portion 84d located on the surface 89a located on the surface 89a and with the discharge inducing portion 89. The cavity portion 90 has a function to absorb thermal expansion of the first discharge electrodes 87, 88, the second discharge electrode 84, the insulator layers 10, and the discharge inducing portion 89 during the electric discharge.

The first capacitor $C3_1$, second capacitor $C3_2$, third capacitor $C3_3$, and fourth capacitor $C3_4$ are located on the side surface 4c side of the element body 4 with respect to the first and second coils $L3_1$, $L3_2$ in the stack direction. The first capacitor $C3_1$ is composed of a conductor $91_1$ and a conductor $92_1$ being a plurality of internal conductors (internal electrodes). The conductor $91_1$ and the conductor $92_1$ are juxtaposed in the stack direction so as to be opposed to each other inside the element body 4. The conductor $91_1$ and conductor $92_1$ are juxtaposed in an order of the conductor $91_1$ and the conductor $92_1$ named from the side nearer to the side surface 4c of the element body 4 in the stack direction.

An end portion $91a_1$ of the conductor $91_1$ is exposed in the side surface 4f of the element body 4 and connected to the external electrode 45. Namely, the conductor $91_1$ is electrically connected through the external electrode 45 to the other end $E3_2$ of the first coil $L3_1$ and to the end portion 83a of the first discharge electrode 83 included in the second ESD suppressor $SP3_2$. An end portion $92a_1$ of the conductor $92_1$ is exposed in the end surface $4a$ of the element body 4 and connected to the external electrode 41. Namely, the conductor $92_1$ is electrically connected through the external electrode 41 to the end portion $84a$ of the second discharge electrode 84 included in the first and second ESD suppressors $SP3_1$, $SP3_2$.

The second capacitor $C3_2$ is composed of a conductor $91_2$ and a conductor $92_2$ being a plurality of internal conductors (internal electrodes). The conductor $91_2$ and the conductor $92_2$ are juxtaposed in the stack direction so as to be opposed to each other inside the element body 4. The conductor $91_2$ and the conductor $92_2$ are arranged on the same insulator layers as the conductor $91_1$ and the conductor $92_1$, respectively, are. The conductor $91_2$ and the conductor $92_2$ are juxtaposed in an order of the conductor $91_2$ and the conductor $92_2$ named from the side nearer to the side surface $4c$ of the element body 4 in the stack direction.

An end portion $91a_2$ of the conductor $91_2$ is exposed in the side surface $4f$ of the element body 4 and connected to the external electrode 46. Namely, the conductor $91_2$ is electrically connected through the external electrode 46 to the other end $E3_4$ of the second coil $L3_2$ and to the end portion $88a$ of the first discharge electrode 88 included in the fourth ESD suppressor $SP3_4$. An end portion $92a_2$ of the conductor $92_2$ is exposed in the end surface $4b$ of the element body 4 and connected to the external electrode 42. Namely, the conductor $92_2$ is electrically connected through the external electrode 42 to the end portion $84c$ of the second discharge electrode 84 included in the third and fourth ESD suppressors $SP3_3$, $SP3_4$.

The third capacitor $C3_3$ is composed of a conductor $91_3$ and the conductor $92_1$ being a plurality of internal conductors (internal electrodes). The conductor $91_3$ and the conductor $92_1$ are juxtaposed in the stack direction so as to be opposed to each other inside the element body 4. The conductor $91_3$ and the conductor $92_1$ are juxtaposed in an order of the conductor $92_1$ and the conductor $91_3$ named from the side nearer to the side surface $4c$ of the element body 4 in the stack direction.

An end portion $91a_3$ of the conductor $91_3$ is exposed in the side surface $4e$ of the element body 4 and connected to the external electrode 43. Namely, the conductor $91_3$ is electrically connected through the external electrode 43 to the one end $E3_1$ of the first coil $L3_1$ and to the end portion $82a$ of the first discharge electrode 82 included in the first ESD suppressor $SP3_1$.

The fourth capacitor $C3_4$ is composed of a conductor $91_4$ and the conductor $92_2$ being a plurality of internal conductors (internal electrodes). The conductor $91_4$ and the conductor $92_2$ are juxtaposed in the stack direction so as to be opposed to each other inside the element body 4. The conductor $91_4$ and the conductor $92_2$ are arranged on the same insulator layers as the conductor $91_3$ and the conductor $92_1$, respectively, are. Namely, the conductor $91_4$ and the conductor $92_2$ are juxtaposed in an order of the conductor $92_2$ and the conductor $91_4$ named from the side nearer to the side surface $4c$ of the element body 4 in the stack direction.

An end portion $91a_4$ of the conductor $91_4$ is exposed in the side surface $4e$ of the element body 4 and connected to the external electrode 44. Namely, the conductor $91_4$ is electrically connected through the external electrode 44 to the one end $E3_3$ of the second coil $L3_2$ and to the end portion $87a$ of the first discharge electrode 87 included in the third ESD suppressor $SP3_3$.

In the present third embodiment, as described above, the cavity portion 86 is located so as to cover the whole of the discharge inducing portion 85 and the cavity portion 90 is located so as to cover the whole of the discharge inducing portion 89, when viewed in the stack direction from the first and second coil $L3_1$, $L3_2$ side, in the same manner as in the aforementioned first and second embodiments. Therefore, each cavity portion 86 or 90 is located between the first and second coils $L3_1$ and $L3_2$ (internal conductors $75_1$-$78_1$, $75_2$-$78_2$) and each discharge inducing portion 85 or 89. Therefore, even in the state in which the material making up the internal conductors $75_1$-$78_1$, $75_2$-$78_2$ can diffuse, each cavity portion 86 or 90 prevents the material making up the internal conductors $75_1$-$78_1$, $75_2$-$78_2$ from diffusing to each discharge inducing portion 85 or 89. As a result, the change in characteristic of the discharge inducing portions 85 and 89 is suppressed in the ESD protection component 3.

Each cavity portion 86 or 90 with the permittivity lower than that of each discharge inducing portion 85, 89 is located between the first and second coils $L3_1$ and $L3_2$ (internal conductors $75_1$-$78_1$, $75_2$-$78_2$) and each discharge inducing portion 85, 89. Therefore, even in the state in which each discharge inducing portion 85, 90 has the high permittivity because it contains the metal particles, the cavity portions 86, 90 reduce the parasitic capacitance occurring due to the permittivity of the discharge inducing portions 85, 89. As a result, it is feasible to reduce the parasitic capacitance occurring between the first and second coils $L3_1$, $L3_2$ and the first to fourth ESD suppressors $SP3_1$, $SP3_2$, $SP3_3$, and $SP3_4$.

Fourth Embodiment

Figure 15:
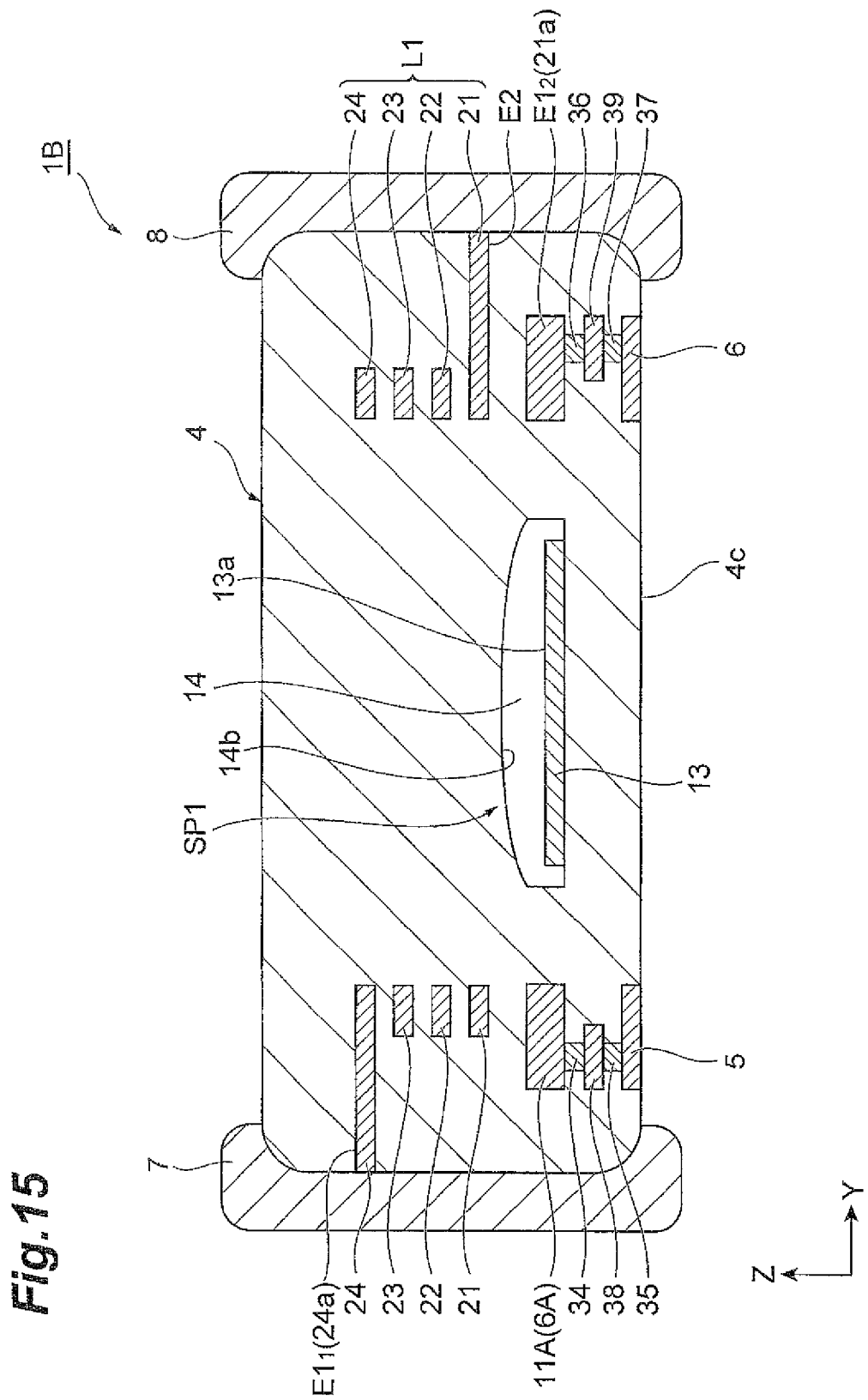
FIG. 15 is a drawing showing a cross-sectional configuration of an ESD protection component according to a fourth embodiment.

Next, a configuration of an ESD protection component 1B according to the fourth embodiment will be described with reference to FIG. 15. FIG. 15 is a drawing showing a cross-sectional configuration of the ESD protection component according to the present embodiment. The present embodiment is different in the configuration of the external electrodes 5, 6 and the external electrodes 7, 8 from the aforementioned first embodiment.

The ESD protection component 1B is provided with the element body 4, the external electrode 5, external electrode 6, external electrode 7, and external electrode 8, the coil L1, and the ESD suppressor SP1 as in the first embodiment. The external electrode 5 and the external electrode 7 are separated from each other on the exterior surface of the element body 4. Namely, the external electrode 5 and the external electrode 7 are not connected to each other. The external electrode 6 and the external electrode 8 are also separated from each other on the exterior surface of the element body 4. Namely, the external electrode 6 and the external electrode 8 are not connected to each other, either.

The ESD protection component 1B is mounted on an electronic device (e.g., a circuit board, an electronic component, or the like) by soldering, using the side surface $4c$ as a mounting surface. At this time, the external electrode 5 and the external electrode 7 become electrically connected through solder (solder fillet). The external electrode 6 and the external electrode 8 also become electrically connected through solder (solder fillet). Therefore, in the ESD protection component 1B, the ESD suppressor SP1 and the coil L1 are connected in parallel in a state in which the ESD protection component 1B is mounted on the electronic device.

Before the ESD protection component 1B is mounted, the external electrode 5 and the external electrode 7 are not connected to each other and the external electrode 6 and the external electrode 8 are not connected to each other, either, as described above. Namely, the ESD suppressor SP1 and the coil L1 are not connected in parallel in a single state of the ESD protection component 1B. Therefore, by bringing the probes into contact with the external electrodes 5, 6, the characteristic of the ESD suppressor SP1 can be measured; by bringing the probes into contact with the external electrodes 7, 8, the characteristic of the coil L1 can be measured.

In the ESD protection component 1B, the change in characteristic of the discharge inducing portion 13 is also suppressed and the parasitic capacitance occurring between the coil L1 and the ESD suppressor SP1 can be reduced.

Next, influence from the value of DC resistance of the coil L1, on the ESD absorption capability of the ESD protection component 1 according to the first embodiment will be described with reference to FIGS. 16 to 18.

Figure 16:
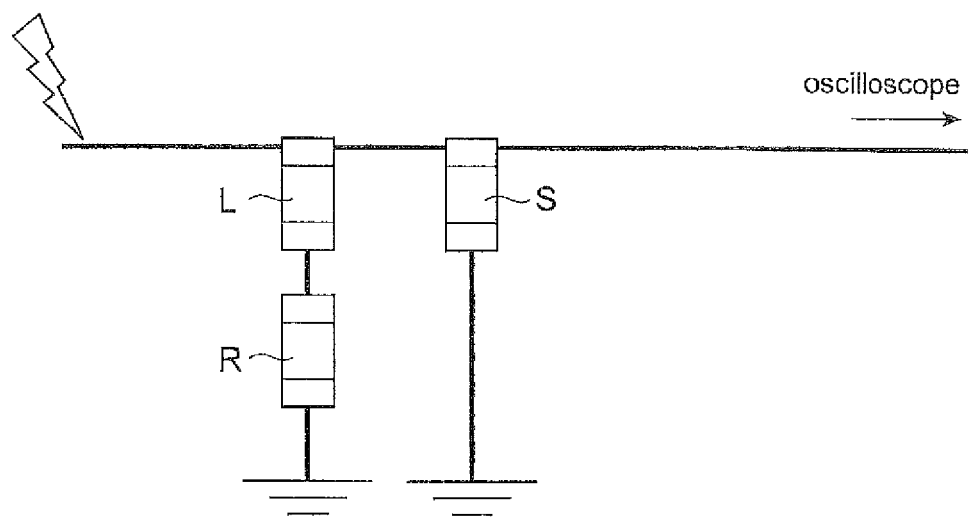
FIG. 16 is a schematic diagram to explain a method for evaluating influence on the ESD absorption capability of the ESD protection component from the value of DC resistance of the coil.

FIG. 16 is a schematic drawing to explain a method for evaluating the influence from the value of DC resistance of the coil L1 on the ESD absorption capability of the ESD protection component 1. As shown in FIG. 16, the evaluation is conducted while a chip resistor R, a coil L, and an ESD suppressor S are mounted on a substrate. The chip resistor R and the coil L are connected in series. The chip resistor R and the coil L are connected in parallel to the ESD suppressor S. In the circuit shown in FIG. 16, the chip resistor R and the coil L correspond to the coil L1 of the ESD protection component 1 and, similarly, the ESD suppressor S corresponds to the ESD suppressor SP1 of the ESD protection component 1. Namely, the ESD suppressor S has the first discharge electrode, second discharge electrode, discharge inducing portion, and cavity portion as the ESD suppressor SP1 does.

In a state in which the chip resistance R is not connected to the coil L, the resistance of the winding of the coil L itself is 1Ω. The chip resistors R with the respective resistances of 1Ω, 2Ω, 5Ω, 10Ω, 20Ω, and 50Ω are connected each in series to this coil L, thereby changing the value of combined resistance (DC resistance Rdc) of the chip resistor R and the coil L to 1Ω, 2Ω, 3Ω, 6Ω, 11Ω, 21Ω, and 51Ω. The state in which the chip resistor R is not connected to the coil L is equivalent to the case where the value of the chip resistor R is 0Ω and the value of DC resistance Rdc at this time is equal to the resistance of the winding of the coil L itself, 1Ω. Changing the value of DC resistance Rdc in this manner corresponds to virtually changing the value of DC resistance of the coil L1 in the first embodiment to 1Ω, 2Ω, 3Ω, 6Ω, 11Ω, 21Ω, and 51Ω.

On the circuit shown in FIG. 16, the ESD suppressor S operates at the voltage of not less than 3.5 kV. Between the coil L and the ESD suppressor S, the charging voltage of 2 kV at which the ESD suppressor S does not operate or 8 kV at which the ESD suppressor S operates is applied to cause the electric discharge. Voltage of this discharge is captured with an oscilloscope and a voltage value at a peak thereof is measured as peak voltage. A voltage value after 30 nsec from the peak voltage is measured as clamp voltage.

FIG. 17 is graphs showing relations between values of DC resistance of the coil and values of discharge voltage, with application of the charging voltage of 2 kV. FIG. 18 is graphs showing relations between values of DC resistance of the coil and values of discharge voltage, with application of the charging voltage of 8 kV. The horizontal axis in FIGS. 17 and 18 represents the values of DC resistance Rdc of the coil L and square dots on the graphs are plots of values of discharge voltage with the values of DC resistance Rdc being 1Ω, 2Ω, 3Ω, 6Ω, 11Ω, 21Ω, and 51Ω. In each of FIGS. 17 and 18 (a) shows the relation between values of DC resistance of the coil and values of peak voltage. In each of FIGS. 17 and 18 (b) shows the relation between values of DC resistance of the coil and values of clamp voltage.

As shown in (a) of FIG. 17, the value of peak voltage with application of the charging voltage of 2 kV increases as the value of DC resistance Rdc of the coil L becomes larger. Namely, the larger the value of DC resistance Rdc of the coil L, the lower the suppression effect of the peak voltage, resulting in degradation of the peak voltage. When the value of DC resistance Rdc of the coil L exceeds 21Ω, this degradation of peak voltage becomes prominent. In the region where the value of DC resistance Rdc of the coil L is not more than 21Ω, the value of peak voltage suddenly decreases at the values of DC resistance Rdc of not more than 11Ω. Similarly, the value of peak voltage suddenly decreases at the values of DC resistance Rdc of not more than 2Ω. Namely, the suppression effect of peak voltage in the region where the DC resistance Rdc is not more than 21Ω is enhanced at and below the boundary where the value of DC resistance becomes 11Ω, and is further enhanced at and below the boundary where it becomes 2Ω.

As shown in (b) of FIG. 17, the value of clamp voltage with application of the charging voltage of 2 kV also increases as the value of DC resistance Rdc of the coil L becomes larger, as in the case of the value of peak voltage. Namely, the larger the value of DC resistance Ado of the coil L, the lower the suppression effect of clamp voltage, resulting in degradation of the clamp voltage. When the value of DC resistance Rdc of the coil L exceeds 21Ω, this degradation of clamp voltage becomes prominent. In general, the value of clamp voltage is required to be not more than 100 V. The values of clamp voltage in the range where the value of DC resistance is not more than 21Ω are not more than 51 V, which well satisfies the required value of not more than 100 V. In the region where the value of DC resistance Rdc of the coil L is not more than 21Ω, the value of clamp voltage suddenly decreases at the values of DC resistance Rdc of not more than 11Ω. Similarly, the value of clamp voltage suddenly decreases at the values of DC resistance Rdc of not more than 2Ω. Namely, the suppression effect of clamp voltage in the region where the DC resistance Rdc is not more than 21Ω is enhanced at and below the boundary where the value of DC resistance becomes 11Ω, and is further enhanced at and below the boundary where it becomes 2Ω.

As shown in (a) of FIG. 18, the value of peak voltage with application of the charging voltage of 8 kV increases as the value of DC resistance Rdc of the coil L becomes larger. Namely, the larger the value of DC resistance Rdc of the coil L, the lower the suppression effect of peak voltage, resulting in degradation of the peak voltage. When the value of DC resistance Rdc of the coil L exceeds 21Ω, this degradation of peak voltage becomes prominent. In the region where the value of DC resistance Rdc of the coil L is not more than 21Ω, the value of peak voltage remains approximately steady at the values of DC resistance Rdc larger than 11Ω but the value of peak voltage decreases at the values of DC resistance Rdc of not more than 11Ω. When the value of DC resistance Rdc is not more than 2Ω, the peak voltage suddenly decreases. Namely, the suppression effect of peak voltage in the region where the DC resistance Rdc is not more than 21Ω is enhanced at and below the boundary where the value of DC resistance becomes 11Ω, and is further enhanced at and below the boundary where it becomes 2Ω.

As shown in (b) of FIG. 18, the value of clamp voltage with application of the charging voltage of 8 kV also increases as the DC resistance Rdc of the coil L becomes larger, as in the case of the value of peak voltage. Namely, the larger the value of DC resistance Rdc of the coil L, the lower the suppression effect of clamp voltage, resulting in degradation of the clamp voltage. When the value of DC resistance Rdc of the coil L exceeds 21Ω, this degradation of clamp voltage becomes prominent. The values of clamp voltage in the range where the value of DC resistance is not more than 21Ω are not more than 45.2 V, which well satisfies the aforementioned required value of not more than 100 V. In the region where the value of DC resistance Rdc of the coil L is not more than 21Ω, the values of clamp voltage remain approximately steady at the values of DC resistance Rdc larger than 11Ω but the value of clamp voltage decreases at the values of DC resistance Rdc of not more than 11Ω. The clamp voltage suddenly decreases when the value of DC resistance Rdc becomes not more than 2Ω. Namely, the suppression effect of clamp voltage in the region where the DC resistance Rdc is not more than 21Ω is enhanced at and below the boundary where the value of DC resistance becomes 11Ω, and is further enhanced at and below the boundary where it becomes 2Ω.

As seen from these evaluation results, the suppression effect of the peak voltage and clamp voltage by the ESD suppressor S to which the coil L is connected becomes more enhanced with decreasing value of DC resistance Rdc of the coil L. The suppression effect is effectively enhanced when the value of DC resistance Rdc of the coil L is not more than 21Ω. Concerning the suppression effect of the peak voltage and clamp voltage, the value of DC resistance Rdc of the coil L is more effectively not more than 11Ω and still more effectively not more than 2Ω.

As described above, changing the value of DC resistance Rdc corresponds to changing the value of DC resistance of the coil L1 which the ESD protection component 1 has. Therefore, the ESD absorption capability of the ESD protection component 1 is effectively improved when the value of DC resistance of the coil L1 is not more than 21Ω. For the ESD absorption capability, the value of DC resistance of the coil L1 is more effectively not more than 11Ω and still more effectively not more than 2Ω.

The above described the embodiments of the present invention but it should be noted that the present invention is not limited to the above embodiments and the present invention can be modified or applied to others without departing from the scope of the description in the claims.

The configurations of the first discharge electrode 11, 61, 65, 68, 72, 82, 83, 87, 88 and the second discharge electrode 12, 62, 69, 84 do not have to be limited to the configurations shown in FIGS. 2, 7, and 11, and they may be modified in length and width, or in the size of the gap portion GP as occasion may demand. The first discharge electrode 11, 61, 65, 68, 72, 82, 83, 87, 88 and the second discharge electrode 12, 62, 69, 84 do not have to be arranged on the same insulator layer 10.

The positions of the discharge inducing portion 13, 63, 66, 70, 73, 85, 90 and the cavity portion 14, 64, 67, 71, 74, 86, 90 do not have to be limited to the positions shown in FIGS. 2-4 and 7-15.

In the ESD protection components not required to achieve the suppression of the characteristic change of the discharge inducing portion and the reduction in parasitic capacitance occurring between the coil and the ESD suppressor, for example, the cavity portion 14, 71, 74 may be arranged so as to be located between the side surface 4c and the discharge inducing portion 13 and the cavity portion 64, 67, 86, 90 may be arranged so as to be located between the side surface 4d and the discharge inducing portion 13. The cavity portion 14, 64, 67, 71, 74, 86, or 90 does not have to cover the whole of the discharge inducing portion 13, 63, 66, 70, 73, 85, or 90 when viewed from the coil L1, L2$_1$, L2$_2$, L3$_1$, or L3$_2$ side. For example, in the first embodiment, the discharge inducing portion 13 does not have to be arranged between the first and second discharge electrodes 11, 12 and the external electrodes 5, 6 when viewed in the stack direction. It may be arranged between the first and second discharge electrodes 11, 12 and the coil L1 as long as it connects the first discharge electrode 11 and the second discharge electrode 12.

In the ESD protection components not required to allow the respective measurements of the characteristics of the coil and the ESD suppressor, the external electrodes 5, 6 are not always needed. For example, the first and second discharge electrodes 11, 12 may be connected directly to the corresponding external electrodes 7, 8.

In the ESD protection components not required to achieve the improvement in ESD absorption capability, the value of DC resistance of the coil L1 does not always have to be set not more than 21Ω.

In the manufacturing process shown in FIG. 5, the measurement of the characteristic of the ESD suppressor SP1 (S11) and the measurement of the characteristic of the coil L1 (S14) may be omitted.

What is claimed is:
1. An ESD protection component comprising:
an element body in which a plurality of insulator layers are stacked;
a coil constructed by connecting a plurality of internal conductors to each other, and arranged in the element body; and
an ESD suppressor arranged in the element body so as to be located alongside of the coil in a stack direction of the plurality of insulator layers,
wherein the ESD suppressor comprises first and second discharge electrodes arranged as separated from each other, and a discharge inducing portion kept in contact with the first and second discharge electrodes so as to connect mutually opposed portions of the first and second discharge electrodes to each other, and containing metal particles,
wherein the first and second discharge electrodes are located on the coil side with respect to the discharge inducing portion, when viewed in the stack direction,
wherein the element body has a cavity portion located so as to cover the whole of the discharge inducing portion when viewed in the stack direction from the coil side, and
wherein the cavity portion is in contact with the mutually opposed portions of the first and second discharge electrodes and with the discharge inducing portion.
2. The ESD protection component according to claim 1, wherein a melting point of a material making up the internal conductors is lower than a melting point of a material making up the metal particles.
3. The ESD protection component according to claim 1, wherein the first discharge electrode has a first side portion extending in one direction perpendicular to the stack direction,
wherein the second discharge electrode has a second side portion extending in the one direction, and
wherein the first and second discharge electrodes are arranged as separated from each other so that the first side portion and the second side portion are opposed to each other.
4. An ESD protection component comprising:
an element body inside which an ESD suppressor comprising first and second discharge electrodes arranged as separated from each other, and a coil constructed by connecting a plurality of internal conductors to each other are arranged;
a first external electrode connected to the first discharge electrode and arranged on an exterior surface of the element body;

a second external electrode connected to the second discharge electrode and arranged on the exterior surface;
a third external electrode connected to one end of the coil and arranged on the exterior surface; and
a fourth external electrode connected to the other end of the coil and arranged on the exterior surface.

5. The ESD protection component according to claim 4,
wherein the element body has a pair of end surfaces opposed to each other, and four side surfaces adjacent to the pair of end surfaces, as the exterior surface,
wherein one side surface out of the four side surfaces is defined as a mounting surface,
wherein the first and second external electrodes are arranged on the one side surface side,
wherein the third external electrode is arranged on one end surface side, and
wherein the fourth external electrode is arranged on the other end surface side.

6. A method for manufacturing an ESD protection component, comprising:
a step of obtaining a structure comprising an element body inside which an ESD suppressor comprising first and second discharge electrodes arranged as separated from each other, and a coil constructed by connecting a plurality of internal conductors to each other are arranged, a first external electrode connected to the first discharge electrode and arranged on an exterior surface of the element body, and a second external electrode connected to the second discharge electrode and arranged on the exterior surface of the element body;
a step of bringing probes into contact with the first and second external electrodes and measuring a characteristic of the ESD suppressor, after the structure is obtained;
a step of forming a third external electrode connected to the first external electrode and to one end of the coil and a fourth external electrode connected to the second external electrode and to the other end of the coil, on the exterior surface, after the characteristic of the ESD suppressor is measured; and
a step of bringing probes into contact with the third and fourth external electrodes and measuring a characteristic of the coil, after the third and fourth external electrodes are formed.

7. An ESD protection component comprising:
an element body in which a plurality of insulator layers are stacked;
a first discharge electrode and a second discharge electrode arranged as separated from each other inside the element body;
a coil arranged inside the element body; and
a first external electrode and a second external electrode arranged on an exterior surface of the element body,
wherein the first discharge electrode is connected to the first external electrode and the second discharge electrode is connected to the second external electrode,
wherein one end of the coil is connected to the first external electrode and the other end of the coil is connected to the second external electrode, and
wherein a value of DC resistance of the coil is not more than 21Ω.

8. The ESD protection component according to claim 7,
wherein the value of DC resistance of the coil is not more than 11Ω.

9. The ESD protection component according to claim 7,
wherein the value of DC resistance of the coil is not more than 2Ω.

* * * * *